United States Patent
Suk et al.

(10) Patent No.: US 9,278,317 B2
(45) Date of Patent: Mar. 8, 2016

(54) HOLLOW FIBER MEMBRANE MODULE WITH MINISKEINS IN MINIHEADERS HAVING A ZIG-ZAG CONFIGURATION

(71) Applicant: LOTTE CHEMICAL CORPORATION, Seoul (KR)

(72) Inventors: Daniel Eumine Suk, Uiwang-si (KR); Jin Min Kim, Uiwang-si (KR); Byung-Kook Hwang, Uiwang-si (KR); Gyu Hong Min, Uiwang-si (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 446 days.

(21) Appl. No.: 13/706,124

(22) Filed: Dec. 5, 2012

(65) Prior Publication Data

US 2013/0146518 A1    Jun. 13, 2013

(30) Foreign Application Priority Data

Dec. 9, 2011  (KR) ........................ 10-2011-0132312

(51) Int. Cl.
*B01D 63/02* (2006.01)
*B01D 63/04* (2006.01)
(Continued)

(52) U.S. Cl.
CPC ............ *B01D 63/024* (2013.01); *B01D 63/021* (2013.01); *B01D 63/043* (2013.01); *B01D 63/026* (2013.01); *B01D 2313/025* (2013.01); *B01D 2313/21* (2013.01);
(Continued)

(58) Field of Classification Search
CPC .... B01D 63/02–63/027; B01D 63/04–63/046; B01D 63/08–63/085; B01D 69/06; B01D 69/08–69/088; B01D 2201/04; B01D 2201/0415; B01D 2201/043–2201/0453; B01D 2201/0469–2201/0492; B01D 2201/285; B01D 2201/287; B01D 2313/20–2313/21; B01D 2313/025; C02F 2201/006; C02F 3/06; C02F 3/1268; C02F 3/1273
See application file for complete search history.

(56) References Cited

U.S. PATENT DOCUMENTS

| | | | | |
|---|---|---|---|---|
| 5,143,312 A | * | 9/1992 | Baurmeister | 242/444 |
| 5,297,591 A | * | 3/1994 | Baurmeister | 139/383 R |
| 5,480,553 A | * | 1/1996 | Yamamori et al. | 210/650 |

(Continued)

OTHER PUBLICATIONS

Square—WolframMathWorld [Apr. 8, 2008; 5 pages].

*Primary Examiner* — David C Mellon
*Assistant Examiner* — Pranav Patel
(74) *Attorney, Agent, or Firm* — Lewis Roca Rothgerber Christie LLP

(57) ABSTRACT

A module of hollow fiber membranes is re-configured to break up and rearrange a skein into multiple miniskeins each having no more than 250 fibers, all lower miniheaders of the miniskeins being slidably held for vertical movement in vertical slots in an aerator box. Upon shrinkage of the fibers, the lower miniheaders rise in the box. Each miniskein has from 2-12 planar ordered arrays in which the fibers are adhesively secured, preferably without potting the lower miniheaders. The lower ends of the fibers are dead-ended and lower miniheaders are positioned sequentially, transverse to the longitudinal axes of the upper header and the aerator box; its upper miniheader is potted in a choice of configurations. This configuration of miniskeins provides a packing density in each miniheader, whether upper or lower, not attainable in a prior art skein; the use of an aerator box having an area (footprint) no greater than 35% of that of the upper header, provides an effective packing density in the aerator box which provides exceptionally effective use of sparging air and readily removable sludge which drops through the bottom of the aerator box.

14 Claims, 16 Drawing Sheets

(51) Int. Cl.
*B01D 69/08* (2006.01)
*C02F 3/12* (2006.01)

(52) U.S. Cl.
CPC .............. *C02F 3/1273* (2013.01); *Y02W 10/15* (2015.05); *Y10T 29/49826* (2015.01)

(56) References Cited

U.S. PATENT DOCUMENTS

| | | |
|---|---|---|
| 5,639,373 A | 6/1997 | Mahendran et al. |
| 5,702,601 A * | 12/1997 | Bikson et al. ............ 210/321.79 |
| 5,910,250 A | 6/1999 | Mahendran et al. |
| 6,899,811 B2 | 5/2005 | Cote et al. |
| RE39,294 E | 9/2006 | Mahendran et al. |
| 7,255,788 B2 * | 8/2007 | Okazaki et al. ................ 210/232 |
| 8,529,814 B2 | 9/2013 | Palinkas et al. |
| 8,579,845 B2 * | 11/2013 | Cloutier et al. .............. 604/6.13 |
| 2002/0179517 A1 * | 12/2002 | Pedersen ..................... 210/321.8 |
| 2005/0115899 A1 * | 6/2005 | Liu et al. ......................... 210/636 |
| 2009/0236280 A1 * | 9/2009 | Morita et al. ............. 210/321.69 |
| 2010/0200481 A1 * | 8/2010 | Nakahara et al. ............. 210/151 |
| 2010/0237014 A1 | 9/2010 | Pedersen et al. |
| 2012/0006739 A1 * | 1/2012 | Doyen et al. ................ 210/323.2 |

* cited by examiner

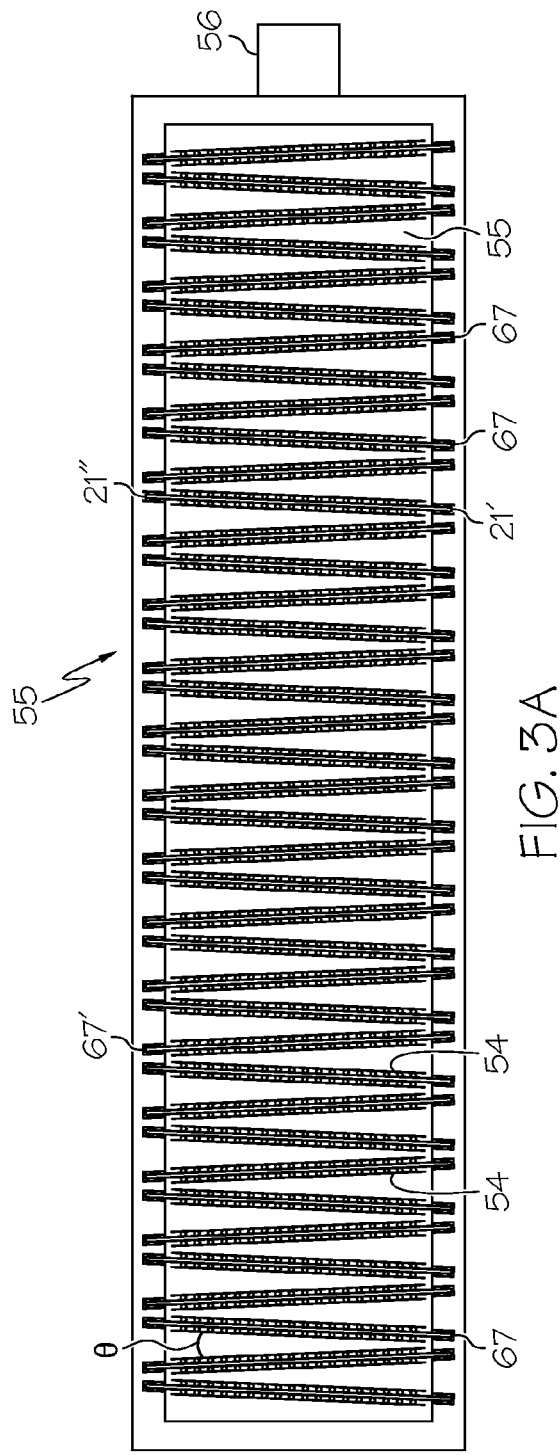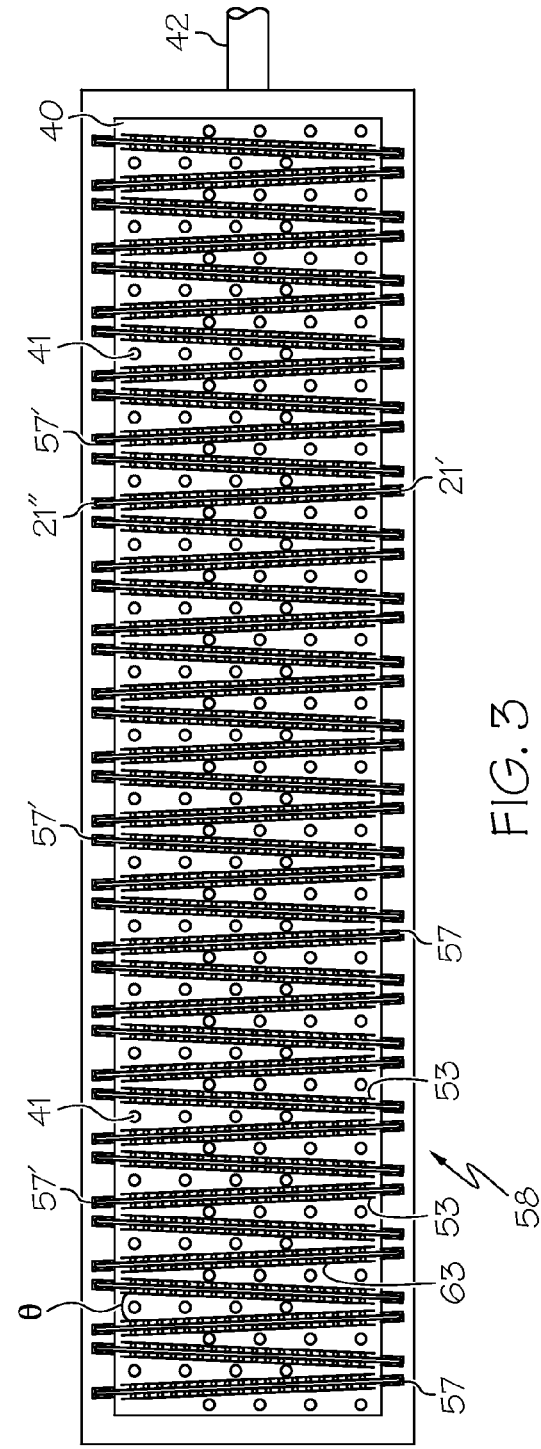

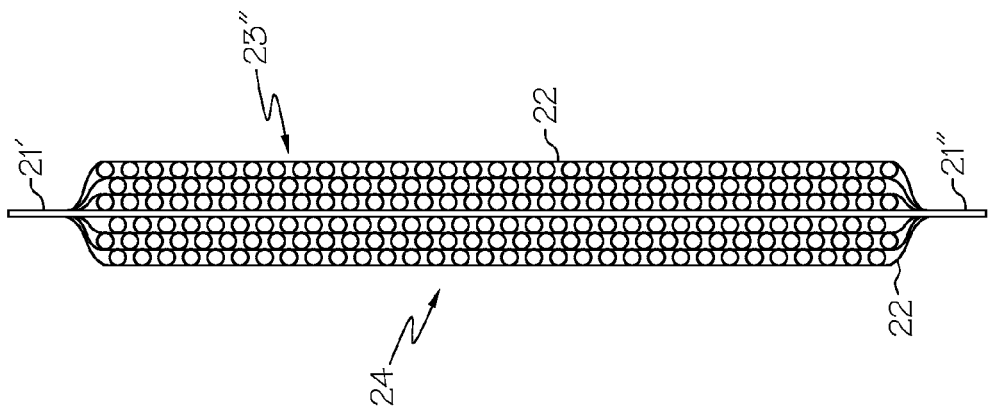
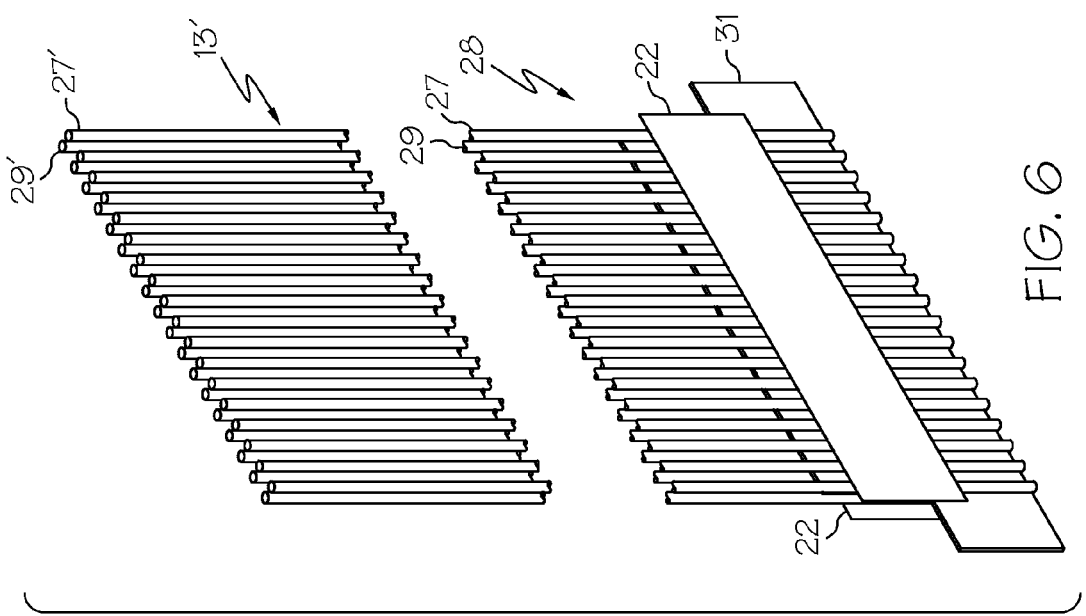

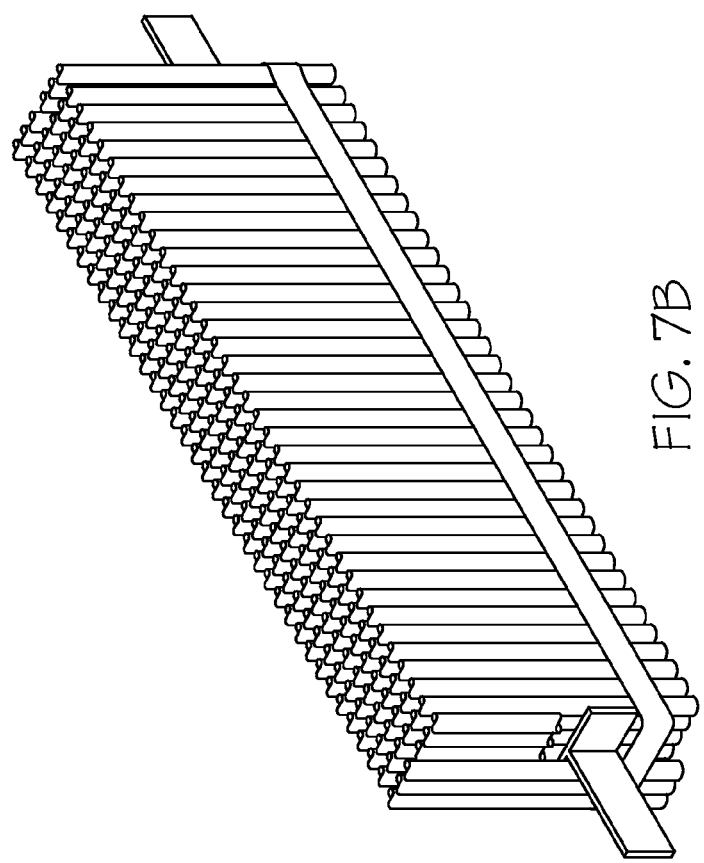
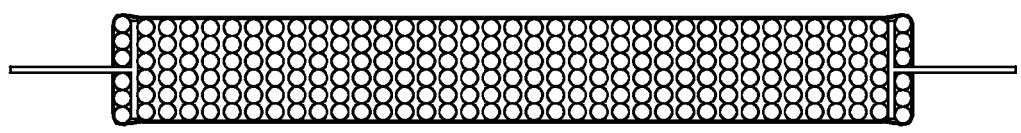
FIG. 7B
FIG. 7A

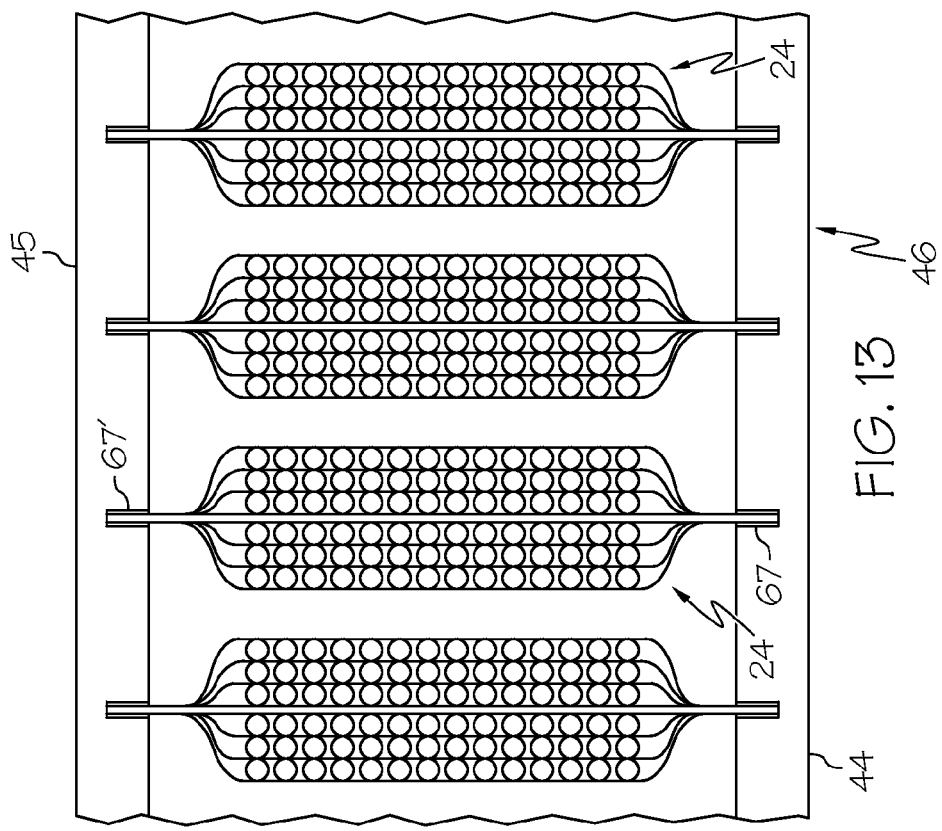
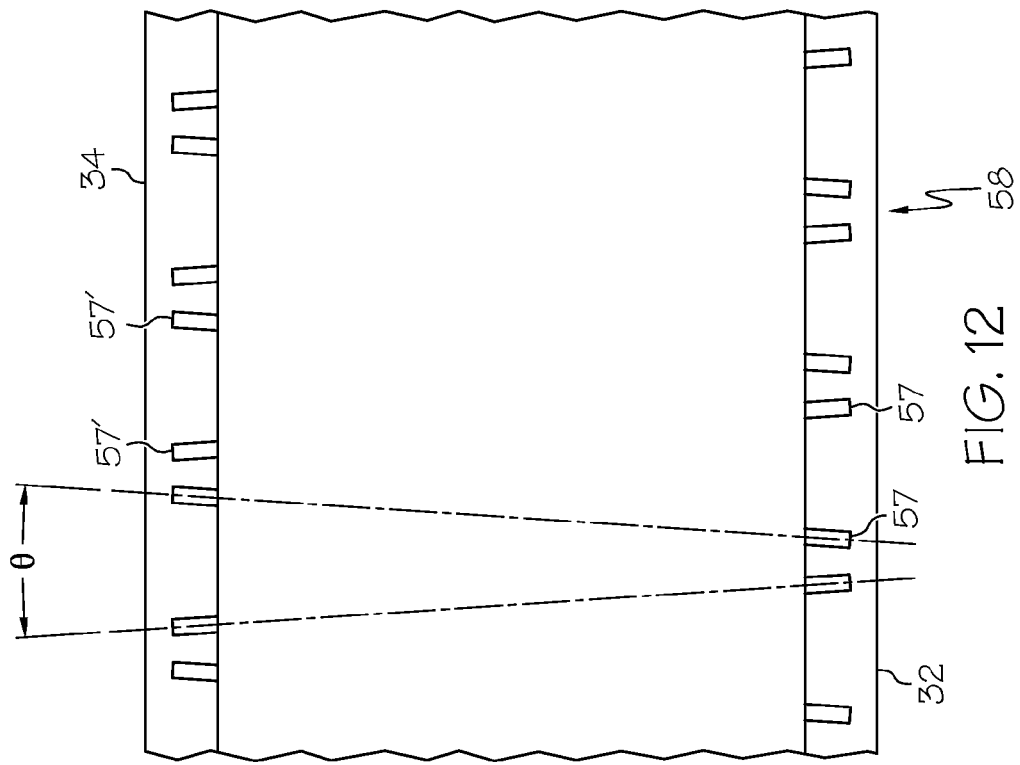

HOLLOW FIBER MEMBRANE MODULE WITH MINISKEINS IN MINIHEADERS HAVING A ZIG-ZAG CONFIGURATION

CROSS-REFERENCE TO RELATED APPLICATION

This application claims priority to Korean Patent Application No. 10-2011-0132312, filed on Dec. 9, 2011 in the Korean Intellectual Property Office.

FIELD OF THE INVENTION

This invention relates to a module of microporous hollow fiber membranes ("fibers" for brevity) used to purify water in a tank in which the module is immersed. A typical module comprises a skein of a multiplicity of tubular membranes, usually thousands, the upper and lower ends of which are potted in upper and lower headers respectively. Because the skein is not enclosed, such modules are referred to as "shell-less" modules which rely on air, sparged from near, and/or below, the lower header, to cleanse the fibers of wet solids being deposited on the fibers' surfaces. More specifically, the invention relates to shell-less modules in which the skein of fibers provide microfiltration and ultrafiltration of a fluid, typically water, held in a tank under atmospheric pressure.

BACKGROUND OF THE INVENTION

Multiple modules, often assembled in a cassette, are deployed in a tank of fluid to be filtered, e.g. water, or wastewater with suspended solids, either for batch filtration, batch-continuous filtration, or less likely, continuous filtration, all processes which are described in the prior art. In all instances, filtration is accompanied with air injected ("sparging air") into the tank so as to generate bubbles which scrub the fibers of a skein to remove solids left on the surfaces of its fibers. Without such scrubbing action, suspended solids in the wastewater would build up on the surfaces of the fibers and around them, and greatly impede filtration.

It is self-evident from the foregoing that, irrespective of the filtration process used, the greater the spacing between fibers, that is, the more open a skein, and the longer the air bubbles can contact the fibers, the longer will their surfaces remain clean, and the better will be the performance of the module. However, the more open a skein, the lower is the surface area of fibers per unit volume of substrate in which the module is deployed, and the higher the cost of using the module.

The prior art has devoted much effort towards configuring a module for a commercially viable process, but has provided little indication as to which features in a module coax the maximum efficiency from a chosen skein of fibers. Modules in which the skein is subdivided into bundles of fibers potted at one end in an upper header and at their opposed ends into multiple lower headers are disclosed in US 2010/0237014, (hereafter "the '014 application", or "'014" for brevity). Improving filtration efficiency is the goal of modules deployed as disclosed in U.S. Pat. No. 6,899,811. The configuration of the novel module disclosed herebelow provides enhanced filtration efficiency.

Packing Density of Fibers in a Header:

The prior art has decreed that an economical skein should have as high a packing density "$\delta$" of fibers in a header as is practical with fibers of a given nominal (outer) diameter from 1-3 mm, chosen fiber-to-fiber spacing, and supply of fiber-cleansing air; the length of the fibers is chosen so as to derive maximum benefit from upwardly streaming air bubbles, while avoiding fiber damage because of fiber-to-fiber interaction or fiber shrinkage. Therefore fibers of the aforesaid diameter, in a header, whether upper or lower, in a prior art elongated rectangular module, typically have a maximum practical packing density "$\delta_h$" of about 0.32 (32%), referred to as "max header density".

The term "packing density" of fibers in a header, sub-divided header or miniheader refers to [the total area occupied by the circular cross-sections of all fibers (based on the outer diameter "d" of each) clustered or bundled within the boundaries in the x-y plane, and within the vertical x-z and y-z planar boundaries of the header, or sub-divided header, or miniheader (referred to as "header"), in which the terminal portions of fibers are secured, whether in arrays or randomly clustered], divided by, [the planar area of the header's footprint in the x-y plane]. A limited number of arrays, that is, from 2-12 arrays, preferably 2-8 arrays, most preferably 2-6 arrays, planarly clustered sequentially, adhesively and back-to-back, the number of fibers in each array limited to 250, are referred to as a miniskein. By "back-to-back" is meant that a pair of arrays may be secured adhesively with a mounting strip therebetween, or with adhesive only, all other arrays, if present, being secured with adhesive only.

For example, a cluster of "n" fibers having an outer diameter "d" occupy a total area of $[n \cdot \pi d^2/4]$ cm$^2$. When the n fibers are anchored in a rectangular header having length "x" cm (measured along the x-axis) and width "y" cm (measured along the y-axis), the footprint of the header is "xy" cm$^2$. The packing density of fibers $\delta_h$ secured in the miniheader is $[(n \cdot \pi d^2/4)/xy]$.

The use of a planar ordered array (or "array" for brevity) to form a header is disclosed in U.S. Pat. No. 5,639,373 and U.S. Pat. No. RE39,294 wherein terminal ends of fibers are fixed, side-by-side on only one side of the mounting strip which provides a physical boundary or barrier for the array. A second such array is prepared on another (second) mounting strip and overlaid upon the first; then a third ordered array is similarly prepared on a third mounting strip and overlaid on the second; and the procedure is further repeated to form a stack of arrays on one side of the mounting strip. The stack of multiple planar ordered arrays (or "arrays" for brevity) on mounting strips is then collectively potted to function as a header.

With a view to optimizing operating costs, a first embodiment illustrated in the '014 application, teaches a bundle of fibers (a "skein") in an elongated rectangular upper header x cm long and y cm wide, arranged in a number of generally parallel sheets or planes (referred to hereinafter as "arrays"); and, the bundle is divided longitudinally into four (4) sub-bundles which are potted in 4 lower sub-headers each '$x_s$' cm long and '$y_s$' cm wide, spaced-apart by 'w' cm, the grouped sub-bundles forming a composite open lower header. The term "composite" refers to the header comprising plural sub-bundles, each of which is formed by sub-dividing the skein of the module. The term "open" refers to the spaces between adjacent sub-divided headers which spaces provide through-passage for air bubbles rising between each sub-divided header to scrub the fibers of the sub-bundle.

In another embodiment is shown a module ("400") in which each sub-bundle is an elongated rectangular cluster of arrays in each of three sub-bundles forming the module (see FIG. 11 of the '014 application). In the first embodiment, the 4 spaced-apart sub-bundled lower headers provide open spaces, each xw cm$^2$ in area, therebetween. Each sub-bundle provides a sub-header having an area $x_s y_s$ cm$^2$. The grouped lower sub-headers are therefore referred to herein as a "composite open lower header".

The area occupied by "n" fibers potted in each of four (4) sub-bundles is $4x_s y_s$ cm² which is less than the total area $[4x_s y_s + 3x_s w]$ cm² occupied by the composite open lower header (which is the footprint of the composite open lower header). If the fibers were sub-bundled and spaced apart in the upper header as shown in FIG. 2, the upper header would be analogously referred to as a "composite upper header" but not a composite open upper header, because the rectangular spaces between spaced-apart sub-bundles in the upper header are filled with potting material and cannot provide an open through passage.

The packing density of the sub-bundled fibers in each sub-header is $[(n \cdot \pi d^2/4)/x_s y_s]/\text{cm}^2$. The "effective packing density" ($\delta_{he}$) of fibers in each sub-header refers to a ratio computed as {the total area $4[n \cdot \pi d^2/4]$ cm² of all the fibers} divided by {the planar area of the footprint, whether xy cm² of a header, or $x_c y_c$ cm² of a composite header having length "$x_c$" and width "$y_c$"}, over which footprint the fibers are distributed. The $\delta_{he}$ of fibers in the composite lower header is $[4(n \cdot \pi d^2/4)/(4x_s y_s + 3x_s w)]$.

If "n" identical fibers having outer diameter "d" are used in a skein the upper ends of which are potted in an upper header A and the lower ends potted in a lower header B, each with the same footprint xy, then $\delta_{he}$ of the fibers in each header is the same, irrespective of how the fibers are distributed in each header.

If the n identical fibers are used in a skein the upper ends of which are potted in an upper header A having area $x_A y_A$ cm² and the lower ends in a lower header, or composite header, B having a different area $x_B y_B$ cm², the $\delta_{he}$ for A and B will be different.

It is self-evident that when the area of the lower header is greater than that of the upper header, the $\delta_{he}$ for lower header B will be lower than that of the upper header A irrespective of whether the length or width of lower header is greater than those of upper header A, or both length and width are greater. In either case the skein will be more open near the lower header than near the upper header because the $\delta_{he}$ for lower header B will be lower than that for the upper header A. Such openness is expected to provide better contact with rising air bubbles and more readily discharged solids which collect at the base of the skein. What cannot be known or knowledgeably calculated is what configuration of skein will provide a combination of a high enough practical packing density $\delta_h$ with a low enough effective packing density $\delta_{he}$ to yield an unexpectedly effective and economically viable module.

Splitting a Skein:

To obtain more effective use of air in a header with desirable packing density, the '373 patent and U.S. Pat. No. 5,910,250 disclose splitting a skein by longitudinally splitting the rectangular upper and lower headers (see FIG. 9 of '373) with a defined open channel for an air-supply tube, with additional air-supply tubes on either side of the bottom header, if desired; and in FIG. 10 of '373 is illustrated two individual skeins which are laterally spaced apart, and cleansing or scrubbing air is introduced between the lower headers.

The foregoing concept of splitting a skein is used in the module disclosed in the '014 application in which module the skein is separated into plural, sub-bundled and separated, longitudinal lower headers ("sub-headers" herein), each having a large number of fibers the lower ends of which are dead-ended (plugged) and potted.

The foregoing principles were embodied in the disclosure of the '373 patent which specified that the terminal portions of potted fibers be spaced apart with center-to-center distance of adjacent fibers preferably in the range from about 1.2-5 times (1.2 d-5 d) the outside diameter 'd' of a fiber, with the admonition that spacing the fibers closer increases the risk of fiber-to-fiber contact near the terminal end portions when the ends are potted (see top of col 17).

There is no disclosure in '014 relating to the packing density in each sub-bundle, or the spacing between sub-bundles, so neither the packing density nor the effective packing density of fibers in each header is known. Neither is there any data in the '014 specification indicating that the sub-bundled skein is more cost-effective than a '373 module with conventional, unitary skein, that is, one in which the fibers are not sub-bundled, or one that is split longitudinally as shown in FIG. 9 of the '373 patent.

Shrinkage and Damage:

It is a characteristic of fibers made from synthetic resinous materials (polymers as opposed to ceramics) that they shrink while operating in liquids as they age (not just by aging but by certain specific conditions of temperature and pressure), when the module is put into service. The amount of shrinking depends upon the type of polymer, the diameter "d" of the fiber, and the type of reinforcement, if any, in the fiber. Because the vertical distance "v" (measured along the z-axis) between the upper and lower headers in a typical currently used module is fixed, if the fibers are only slightly, that is in the range from 0.5%-2% longer than "v", shrinkage during operation over time, tends to break them. If the fibers are substantially longer, that is in the range from 5-10% longer than "v", the fibers sway in the aerated substrate, usually wastewater, due to the force of uprising gas bubbles, causing a scrubbing action between adjacent fibers. The longer the fibers, the more they sway, and the greater the likely damage. Damaged fibers leak. A single broken and protruding fiber in an operating skein may be sufficient to have the skein removed from service.

As a result, experience in the field with skeins of commonly used polymeric fibers, and the prior art, suggests that, for headers spaced at a vertical distance 'v', fibers are used which are in the range from 0.5%~5% longer than 'v'. At the upper end of the range, the slack in the fibers may cause damage due to rubbing against each other, and at the lower end of the range, risk breakage due to being overstretched.

In the '014 disclosure, the fibers are potted in various arrangements. For example, fibers in a sub-bundle may be randomly arranged in a lower header, or potted as a stack of mounting strips, each with an array, as disclosed in '373. The upper ends of fibers of each of the multiple sub-bundles (four shown in '014) may be mixed in the upper header; or, the upper ends of fibers of one sub-bundle may be kept from mixing with fibers of other adjacent sub-bundles in the upper header. In the case where the sub-bundling is preserved in the upper header, the spacing between the fibers may be increased, and the spacing between adjacent sub-bundles decreased relative to the spacing in the lower headers. In the case of fibers arranged in arrays, the rows may be generally evenly spaced in the headers, but at a greater spacing in the upper header (see [0042] of the '014 application).

In other words, the '014 disclosure teaches that there is nothing critical about the arrangement of the fibers either in the upper header or in the subdivided lower headers; and no significance is accorded to the packing density $\delta_h$ within a subdivided header, and/or, the effective packing density $\delta_{he}$ in the header.

As an illustrative example, an '014 upper header may have from 8 to 30 arrays and be from 5 to 20 cm in width, the length of an array (number of fibers in an array) being indeterminate; a lower header may have from 1 to 5 arrays and be from 0.5 to 4 cm in width, the length of an array being indeterminate. The headers may be elongated in plan view having a ratio of length to width of, for example, 2 or more or 4 or more or 8 or more.

Volumetric Packing Density of Fibers in a Module in Service in a Tank:

One cannot predict performance of a skein from its volumetric packing density. In particular, there is no indication in '014 as to the length of the fibers, or as to the footprint of the headers, or the vertical distance between the upper and lower headers; or, whether the area of the lower header may be greater than that of the upper header; therefore the volumetric packing density of the '014 skein fibers in the wastewater is not known. The term "volumetric packing density" ("$\delta_v$") refers to the ratio of [the volume of all 'n' fibers each having a cross-sectional area "$\pi d^2/4$" and length "L" cm between upper and lower headers vertically spaced apart at 'v' cm, each header having a footprint xy cm$^2$] to [the volume of wastewater occupied by the skein of fibers]. The ratio is computed as $\delta_v = [n \, \pi d^2/4 \cdot L]/[xy \cdot v]$. The more fibers of given length and given fiber spacing 's', that can be packed into a fixed volume of substrate, the higher the volumetric packing density. When the fibers are relatively straight and taut between upper and lower modules, that is, v=L, then $\delta_v$ will be equal to the packing density "$\delta_h$".

With fibers of length v≈L, and appropriate fiber spacing 's', higher $\delta_v$ nevertheless allows longer and better contact, therefore better scrubbing with uprising air bubbles because the fibers are more vertical and straighter. When the fibers are much longer than the vertical distance between headers, they will sway back and forth in an uprising stream of air bubbles in an irregularly shaped wastewater column larger than the rectangular parallelpiped xyv, the boundaries of which larger irregular column are constantly changing.

In a comparison of two modules using the same fibers, with the vertical distance 'v' between the opposed faces being the same, and the areas of the upper and lower headers being the same, and the fiber spacing in each header being the same, $\delta_v$ would be expected to be the same. Thus the effect of $\delta_v$ on performance of each module would be expected to be the same.

To improve the performance one might consider decreasing $\delta_v$ to allow more space between fibers, not increasing $\delta_v$, which would provide opportunities for fibers to scrub against each other, and increases the chance of one or more fibers being damaged. Yet, by sub-bundling the fibers in headers of the '014 composite lower header, and laterally spacing the sub-bundled headers apart, it is clear $\delta_v$ would be increased in each sub-bundle, and also in the adjacent lower portions of the volume of substrate.

In a comparison of two modules, if each module is used for filtering the same wastewater with the same stated amount of air per unit fiber surface, in the same way, that is, cycling the air in a particular manner, any difference in performance of the modules will be attributable to: (i) the difference in packing densities ($\Delta\delta_h$) of fibers in each header or sub-divided header; (ii) the difference in effective packing densities ($\Delta\delta_{he}$) of fibers in each header, or aerator box (or "box" for brevity); (iii) the difference in volumetric packing densities ($\Delta\delta_v$); and, (iv) the difference in effective volumetric packing densities ($\Delta\delta_{ve}$) of the same number of fibers in a header having an area larger or smaller than the one for which $\delta_v$ was calculated.

In a comparison of the performance of two modules, a difference in performance must be attributable to differences in the foregoing properties which differences are determined by the packing densities of fiber in each, whether and how the headers are sub-divided, and how the sub-divided headers are configured in each header.

The term "performance" refers to the flux or rate of flow of permeate through a unit of membrane surface (liters/m$^2$/hr) (LMH) or (gals/ft$^2$/day) for each module at a specified rate of flow of air (liters/min/m$^2$) or (m$^3$/m$^2$/hr) or (scfm/ft$^2$) of filtration surface, while filtering wastewater which has a fouling rate of 0.1 kPa/min.

The Problem:

The prior art has failed to appreciate the interaction (i) of packing density of fibers in a header of arrays (the term "array" is used herein to denote "a planar ordered array" unless stated otherwise), (ii) of effective packing density of fibers in headers, (iii) of volumetric packing density of fibers in the column of wastewater occupied by the fibers of a skein in operation, and (iv) of effective volumetric packing density of fibers in the column of wastewater occupied by the fibers distributed over a larger area in one header compared to the area in the other, as they together factor into the performance of a module.

Performance of most fiber filtration modules having the same filtration area are expected to be about the same. However, much like in a marathon, it is the long term performance, that is the module's performance after several days of continuous operation under normally encountered filtration conditions, or over a period of at least 48 hours under accelerated sludge-forming conditions, that makes the difference. The prior art also failed to realize that there is an upper limit to the number of arrays overlappingly secured to a single mounting strip because efficient use of filtration surface requires that no more than 73.5%, preferably no more than 52% of the fibers in a lower header be surrounded (that is, fully encircled) by other adjacent fibers.

The goal is to design and construct a more efficient, reliably operable, hence more economical, shell-less module than any available in the prior art.

SUMMARY OF THE INVENTION

In a module utilizing a skein with sub-bundled headers, as described in the '014 application, the '014 skein has been found to be less economical than a skein comprising multiple, at least four (4) miniskeins, each miniskein with at least one pair of arrays, each array having from 10-250 fibers laterally spaced apart from each other, the arrays positioned back-to-back; and, the number of fibers in each array may be the same or different. Preferably, for convenience in building an array, each array has the same number of fibers. The upper portions of the fibers are potted in a common unitary upper header; the lower ends of the fibers are plugged, and the combined back-to-back arrays are adhesively secured to each other, preferably without being attached to a pan (that is, "potted"), to form a "not-potted" lower miniheader. If the lower miniheaders are potted in a potting pan ("pan"), its opposed longitudinal ends are provided with mounting stubs adapted to move vertically in grooves in opposed walls of an aerator box while maintaining a zig-zag configuration. The opposed ends of each lower miniheader are thus provided with laterally protruding skein-mounting means the choice of which depending upon the particular embodiment of lower miniheader desired.

It has been discovered that at least four (4) miniskeins mounted in a zig-zag configuration described hereinbelow, provides an unexpectedly efficient module (referred to herein as a "zig-zag" module). The upper ends of the fibers of each miniskein are preferably confined, and separate from upper ends of an adjacent miniskein, before all upper ends are potted integrally in a unitary header. The lower ends of the fibers of each miniskein are plugged, and adhered together, preferably with a hot-melt adhesive in the form of tape or ribbon, or otherwise adhered in laterally spaced-apart relationship, with or without a fiber-mounting strip, to form each lower miniheader. When a fiber-mounting strip is used, it is planar; when stub-strips are used in a miniheader their function is to mount the miniheader, not mount fibers, and they may not lie in the same plane as the fibers in an array.

Multiple such lower miniheaders, are spaced apart angularly and transversely along a longitudinal direction in the box (x-axis being the longitudinal direction in the box) in a zig-zag configuration. The box has both, an open top and an open bottom, and vertical (z-axis) slots, preferably angulated (relative to the x and y axes), in the inside surfaces of its opposed longitudinal walls (such a box is referred to as a "slotted box"). A lower miniheader may be fixedly secured in opposed slots, or more preferably, be mounted for up and down movement within the box while the module is in operation. An aerator means is inserted in the open bottom directly below and proximate to the lower miniheaders. The rectangular open area of the box may be the same as, or up to 1.35 times greater than that of the upper header.

An alternative configuration is of lower miniheaders, in which the multiple lower miniheaders are spaced apart (each lying along its y-axis) in parallel relationship to each other, transversely (x-axis) in a longitudinal direction in the box. Such a configuration, with either un-potted or potted lower miniheaders, is referred to as a parallel configuration. The performance of the parallel configuration is comparable to that of the zig-zag configuration, but its choice is more application-specific.

A module comprises a unitary elongated upper header and a vertically spaced-apart, co-directionally aligned, elongated aerator box, each having footprints in the range from the same area, to the box having a 35% greater area than that of the upper header, so as to provide at least the same, but preferably a lower effective packing density in the box, preferably less than 38%. Preferably, whether having the same or different footprints, both the header and the box are each at least twice as long as each is wide. When the box has an area greater than that of the upper header, either its width or length, or both may be greater than the corresponding dimension of the upper header, provided the footprint of the box has an area no greater than 1.35 times the area of the upper header. In water treatment with the zig-zag module, a ratio higher than 1.35 typically provides no commensurately greater benefit than with a ratio of 1.35.

Most preferably, the upper portions of fibers in the skeins are linearly grouped within each of the several channels between the parallel tines of a comb, the fibers confined between adjacent tines forming upper miniheaders. The comb-aligned fibers of the parallel upper miniheaders are integrally potted in the upper header, as described above.

A configuration of confined and potted upper miniheaders, as described above, provides them with the highest practical maximum miniheader packing density "$\delta_h$", the highest effective volumetric packing density ($\Delta\delta_{ve}$) of fibers in the substrate, but a favorably low effective packing density in the upper header.

The box is disposed directly beneath the upper header, the box and header being preferably each disposed symmetrically about their vertical planes, namely the x-z longitudinal vertical plane and the y-z orthogonal vertical plane.

It is essential that the effective width of a lower miniheader be greater than the width of the aerator box because successive lower miniheaders are held in vertical, preferably angulated, slots in the opposed walls of the box, each lower miniheader positioned angularly and transverse to the longitudinal direction in the box. The slots are cut so that each vertical lower miniheader is at a specified included angle to an adjacent lower miniheader so as, in plan view, to present the miniskeins in a zig-zag configuration, each pair of adjacent miniheaders forming a V. The included angle between adjacent miniheaders in a zig-zag configuration is in the range from 1°-20°, preferably 5°-10°, depending upon the type of substrate being filtered, its solids content, the size range of suspended solids, and other criteria.

In a skein sub-divided into multiple miniskeins, the zig-zag configuration of the skein's miniheaders, in combination with the length of the fibers, influences the average angle at which the fibers in the substrate are presented to the vertically rising bubbles. The length of fibers of each miniskein exposed to substrate is restricted so as to be in a range from 0-5% greater than the fixed vertical distance between lower face of the upper header and the upper face of a lower miniheader directly beneath. Each lower miniheader is movably, frictionally and controllably secured in a vertical slot so that each lower miniheader may freely move vertically as the fibers in the miniskein shrink. When the length L of fibers in a miniskein equals 'v', the lower miniheader is initially positioned near the bottom of the slots in the walls of the box. Upon shrinking, the lower miniheader is pulled upwards in the slots of the box. As will be readily apparent, the precise amount of frictional force with which the lower miniheaders is held will depend upon numerous factors such as the type of construction of the fibers, whether braided or not, the type of polymer used for the membrane's polymer film, the amount of sparging air used during normal operation, and other factors.

When held relatively taut and substantially vertical, the fibers of a miniskein permit operation with a volumetric packing density $\delta_v$ higher than that possible with a prior art skein in which the length of fibers is >5% longer than the fixed distance between the upper and lower headers. The zig-zag configuration allows for the efficient use of air; and as a result, the differences in performance between this module and a prior art module with a longitudinally spaced apart subdivided skein, translates into unexpectedly high savings in the cost of operation of the filtration process.

It has been discovered that an effective packing density $\delta_{he}$, lower than that typically deemed optimum in the headers of a typical prior art module is surprisingly more effective when the lower $\delta_{he}$ is achieved by dividing the fibers of a skein so that it is subdivided into multiple miniskeins, each with its own lower non-potted miniheader, the packing density $\delta_h$ of fibers on each lower miniheader being greater than 25%.

In a preferred embodiment, the novel module, for efficient performance, fiber spacing in an array may not be greater than three times the diameter of a fiber as long as the fibers are in miniskeins grouped in from 2-7 arrays, total; preferably in groups of 2-3 such arrays on each side of a mounting strip. Plural such arrays on each side are sequentially overlaid, one atop the other, and secured, to either or both sides of a fiber-mounting strip, preferably without being potted, so as to have a maximum packing density $\delta_h$ in the lower miniheaders greater than 0.25 or 25%; the preferred effective packing density $\delta_{he}$ in the box is 0.30-0.35; and in the upper header is in the range from 0.35-0.55.

The unexpected effectiveness of the combination of higher packing density on a miniheader and lower effective packing density in the box is compromised when either (i) the width of the box is more than 35% greater than the width of the upper header, when their lengths are the same, or (ii) the length of the aerator box is more than 35% greater than that of the upper header, when their widths are the same, or (iii) both the length and the width of the aerator box are each enough longer than those of the upper header to provide an area which is greater than 35% of the area of the upper header. Therefore the dimensions of a box are chosen so that they are no greater than the limited dimensions as a result of the foregoing considerations.

A skein comprising multiple upper miniheaders with thousands of fibers, is able to provide an effective packing density "$\delta_{he}$," in the upper header which is substantially less than that found in a typical currently used skein such as the Zenon Model No. 500D. Such lower effective packing density in the upper header, combined with ready access of scrubbing air bubbles between each miniskein and between the fibers in each miniskein, results in unexpectedly low fouling, and yields better performance than a comparable prior art module.

All fibers in the novel module remain substantially linear with minimal sway because each lower miniheader is held by its own weight and friction in opposed angulated vertical grooves cut in the sides the aerator box, so as to allow free but friction-controlled up-and-down movement of the lower miniheader. By "angulated" is meant that the slots are cut in a plane at an angle to both the vertical x-z and y-z planes. It will be understood that the opposed mounting means, whether individual mounting tabs, integral mounting tabs at opposed ends of a fiber-mounting strip, or opposed T-pins at each end of a lower miniheader, could be held in vertical non-angulated slots; however, to provide the optimum amount of controlled friction of the mounting means in the slots, it is preferred to angulate the vertical slots (the vertical central plane of each slot will be at an acute angle to the plane of the wall of the box), and to have laminar ends of the mounting means so as to minimize twisting of the miniheaders. The friction is controlled so as not to be so low as to allow the miniheaders to float upwards when air is sparged beneath them, and not so high as to prevent the lower miniheaders from freely moving upward when the fibers contract.

A method for making a module for withdrawing permeate from a multicomponent liquid substrate while increasing the concentration of particulate material therein, comprises,
(i) assembling at least four miniskeins each comprising at least two, and up to twelve arrays of fibers, each array having from 10-250 fibers, the upper portions of the fibers to be potted in an integral upper header in a configuration of choice, the lower portions of the fibers being overlaid one atop the other to form a lower miniheader, each array having the fibers adhesively secured in laterally spaced-apart relationship with each other;
(ii) potting the upper portions of the fibers in an upper header so as to have lumens of the fibers in open fluid communication with a permeate collection means, the upper header being immovably secured in position vertically above an aerator box; and,
(iii) securing each lower miniheader of each miniskein for up-and-down movement in opposed walls of the aerator box, successive lower miniheaders being in transversely, angularly spaced-apart (along the x-axis) relationship with each other in a zig-zag configuration relative to the longitudinal axes (x-axis) of the upper header and aerator box, so that successive miniskeins in the configuration have an included angle in the range from 1-20 degrees in the aerator box.

BRIEF DESCRIPTION OF THE DRAWING

The foregoing and additional objects and advantages of the invention will best be understood by reference to the following detailed description, accompanied with schematic illustrations of preferred embodiments of the invention, in which illustrations like reference numerals refer to like elements, and in which:

FIG. 3 is a plan view taken along the direction 3-3 in FIG. 2, in an embodiment of the second module in which the miniskeins are minimal miniskeins, showing the angulation between successive lower miniheaders in the open-bottomed aerator box. The multiple through-apertures shown between lower miniheaders are perforations in the top of air-sparging means beneath the box, preferably multiple air-pipes supplied by a common air-supply duct. The box has a footprint 26.5% greater than that of the upper header.

FIG. 3A is a plan view taken along the direction 3A-3A in FIG. 2, showing an embodiment in which the upper miniheaders of each minimal miniskein are held in arrays, corresponding to those in the lower miniheader, the upper miniheaders forming an integral part of the upper header of the second module. The angulation between successive potted upper miniheaders potted is the same as that of the lower miniheaders.

FIG. 6 illustrates, in staggered perspective view, a miniheader comprising two, first and second arrays, stacked back-to-back on the front face of a mounting strip. The second array on the front face is shown with an unmelted ribbon of adhesive covering its fibers. Shown broken away from the two-array stack of the front face of the strip, above and behind the front stack, is a rear stack of two more, namely third and fourth arrays. In each stack, an overlying array is overlaid, congruently or interdigitated, on a lower array previously adhesively secured to the one side of the mounting strip.

FIG. 7 is a bottom plan cross-sectional view showing a miniheader in which layers of adhesive secure three arrays, successively interdigitated, one atop the other, on each side of a mounting strip.

FIG. 7A is a bottom plan cross-sectional view showing a miniheader with no mounting strip, and wherein six arrays are adhesively layered congruently one atop the other, and T-shaped pins inserted near the ends of the miniheader after it is formed.

FIG. 7B is a perspective view of the six-array miniheader shown in FIG. 7, with a T-pin inserted at each end behind spaced-apart fibers in an end of the assembled miniheader, just above adhesive securing end-portions of the arrays.

FIG. 12 is a top plan view, with ends broken off, of an aerator box, showing the angulated vertical slots in opposed longitudinal walls. Opposed end walls are broken away and not visible. The box is open on top and open at the bottom.

FIG. 13 is a bottom plan view, with ends broken off, of an upper header in which plural six-array miniskeins are potted, the header having the same width but 25% smaller length than the box below it (see FIG. 14).

DETAILED DESCRIPTION OF THE INVENTION

In all embodiments of the novel module, the skein-mounting means allows each lower miniheader, preferably "not-potted", to be mounted for up-and-down movement in a mounting frame which serves as the aerator box ("box" for brevity) and is hereafter referred to as such.

The upper portions of the fibers of each miniskein are collectively potted in an upper header, approximately vertically above the corresponding lower miniheaders; and, the terminal ends of the upper portions are in open communication with a permeate-collecting trough. The upper header is generally similar in shape to the aerator box, each typically being rectangular, and the planar area of a bottom face or 'footprint' of the upper header, is at least the same as that of the box.

Figure 1:
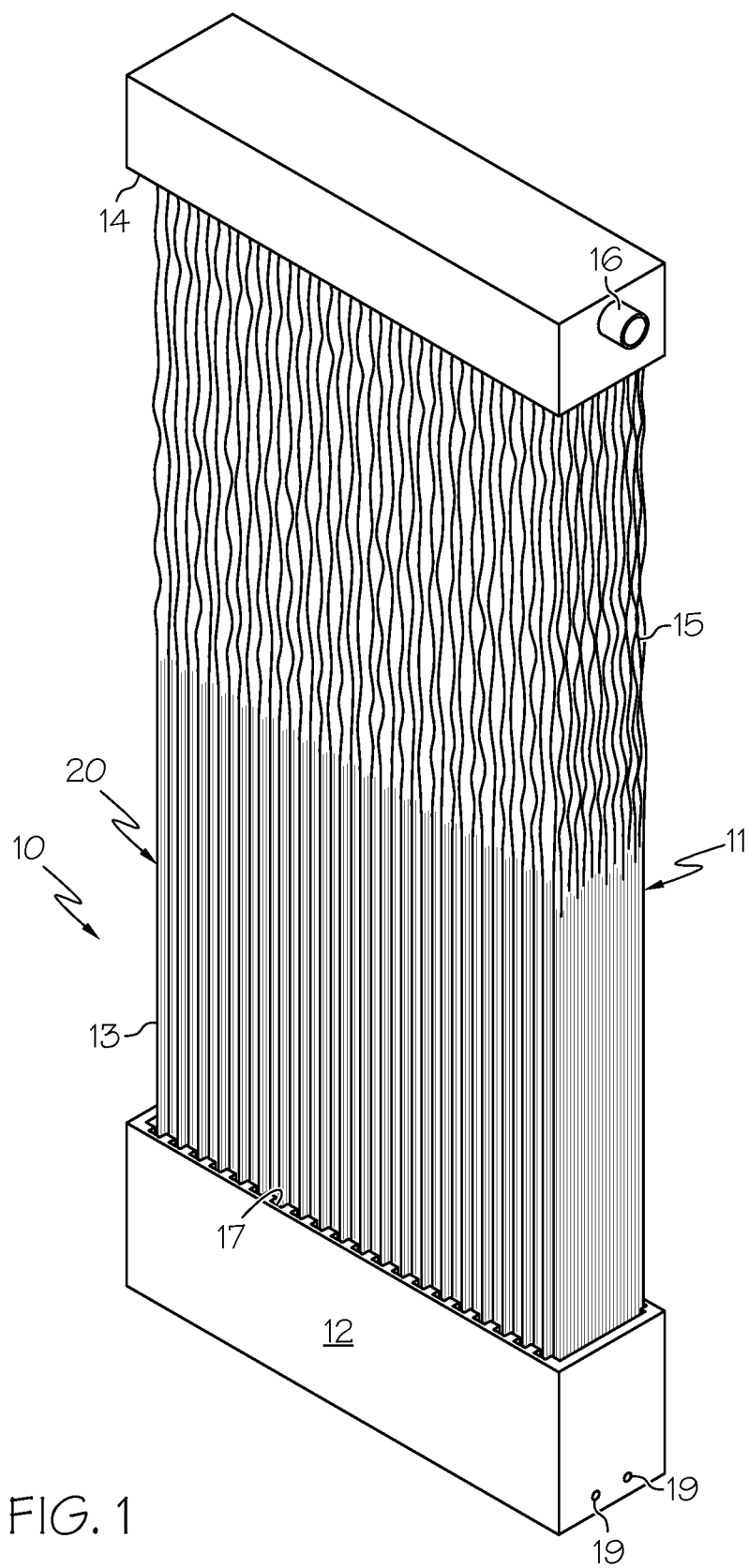
FIG. 1 is a perspective view of a first module in which fibers, arranged in arrays, upper portions of which are potted and lower portions of which are fixedly secured in lower miniheaders movably mounted in an aerator box, in lieu of a conventional lower header.

In the novel module, the potted configuration of the upper portions of fibers in the upper header is not narrowly critical, so long as they are potted in the upper header in spaced-apart relationship relative to each other in any one of several upper header configurations:

(i) with fibers of each miniskein randomly positioned relative to each other, when the miniskeins are held with lower miniheaders above a potting pan in which the upper portions are to be potted, so that upper portions of fibers of arrays of a first miniskein are naturally separated from upper portions of an adjacent second miniskein by virtue of all fibers hanging substantially straight down due to their weight;

(ii) with the miniskeins hanging upside down as above, but the lower, hanging portions of individual fibers of each miniskein are confined between tines of a separation means, such as a comb; the hanging portions of fibers of adjacent miniskeins are thus kept separate, so that they may be integrally potted so that the fibers are collectively parallel to the y-axis in an upper header (see FIG. 1). The tines are horizontally (in the x-y plane) positioned, directly below the lower ends of the hanging arrays in the corresponding lower miniheaders, so that the comb-confined and aligned fibers of each upper miniheader, collectively, lie parallel to the y-axis when potted in the upper header;

(iii) with upper portions of fibers of each miniskein secured in arrays in an upper miniheader equipped with mounting means, the upper miniheaders are held in parallel, spaced-apart, vertical slots in a potting pan and potted to form an integral header with a permeate withdrawal line; and, (iv) with upper portions of fibers of each miniskein secured in arrays in upper miniheaders equipped with mounting means, analogously with the secured arrays in the lower miniheader, and, each upper miniheader is potted so that it is positioned vertically directly above, and in approximate mirror-image relationship with the corresponding lower miniheader in which the lower ends of fibers are secured, when the areas of the upper header and the box are essentially equal. They are not in strict mirror-image relationship when the box has a greater area than the upper header.

In a first embodiment of a miniheader, the lower portions of a first pair of arrays are securely adhered to a fiber-mounting strip. The term "strip" refers to a laminar, heat-stable, rigid material of arbitrary length, cut to length as needed, which will not bend during operation of the module sufficiently to have a lower miniheader come out of the slots in the aerator box in which the miniheader is mounted. The strip has a generally uniform width in the range from about 0.5 cm-5 cm, preferably 1-3 cm wide, and uniform thickness in the range from about 0.5 mm-5 mm, preferably 1 mm-2 mm thick, depending upon the diameter and number of fibers to be used in an array, the type of adhesive used, and the tensile strength at yield, hardness and impact strength of the material. Preferred is a synthetic resinous material such as a lower $C_2$-$C_4$ polyolefin, PVC or ABS, which material has a tensile strength @ yield (ASTM D638) of at least 40 MPa; a hardness of at least 50 Shore D (ASTM D2240); and impact strength @ 23° C. (IZOD: ASTM D256) of at least 50 J/m.

The adhesive may be a viscous liquid, or liquefiable, preferably meltable adhesive. The strip is unaffected by a temperature at which adhesive for the fibers melts, and insoluble in the fluid to be filtered. The strip may be marked with laterally spaced-apart "location marks", or, provided with spaced-apart parallel grooves in its surface.

The strip provides a stable platform on which to build a miniheader; and, in this first embodiment of a miniheader, the opposed ends of the strip provide mounting tabs which are an integral portion of the miniskein. At least two arrays are secured to the strip, preferably one on each side, back-to-back. When more than two arrays are adhered to the mounting strip, preferably the same number of arrays is layered, back-to-back, on each side of it.

In a second embodiment of a miniheader, each array is adhesively secured, back-to-back, preferably with a meltable adhesive ribbon, and without a fiber-mounting strip. The opposed skein-mounting means is provided with individual skein-mounting tabs (referred to as "mounting tabs"). The mounting tabs may be provided with either (i) opposed stub-strips to each of which an end-portion of an array is adhesively secured so that the stub-strips are integrated into the miniheader, or (ii) separate, individual T-pins inserted behind fibers in arrays near opposed ends of a miniheader, after it is formed. The individual T-pins are preferably non-removably secured within the lower portion of a miniskein for up-and-down movement in the box. Whether stub-strips or T-pins, such mounting tabs are held in opposed vertical slots in the longitudinal walls of the box, and are movable upward when the fibers contract longitudinally, preventing them from breaking.

Irrespective of how the upper portions of the fibers of the arrays of each miniskein are potted in the upper header, the lower portions of arrays of each of the plural minskeins are clustered in "lower miniheaders" arranged in a well-defined zig-zag configuration in the box; and, from 2-8 arrays are secured in each lower miniheader.

In a first embodiment of the module, the upper header has substantially the same shape, and substantially the same footprint or area as the box. In a second embodiment of the module, the upper header has substantially the same shape as the box, but the box has an area or footprint up to 35% greater than that of the upper header.

In each embodiment, the width (measured along the y-axis) of a lower miniheader, is greater than the width of the box (also measured along the y-axis). In a "zig-zag module", at least four (4) lower miniheaders are mounted in zig-zag configuration transverse to the longitudinal x-axis of the aerator box, and at an angle to both the x- and y-axes.

In the assembled module with lower miniheaders in a zig-zag configuration, the upper header is immovably held in vertically spaced apart relationship with the box. When required, the miniskeins are cleansed by copious amounts of air injected below and between the lower miniheaders, opposed ends of which are mounted in the opposed walls of the box. Plural modules are typically held in a cage or cassette to be deployed in a tank. Such cages are typically held in a frame adapted to be strategically located within a tank of fluid to be filtered.

The terminal portions of the fibers in each array of a miniheader are laterally spaced apart at a predetermined distance in the range from 0.1-3 d where "d" is outer diameter of a fiber; and successive arrays are adhered to form a miniheader as described below.

FIG. 1 is a perspective view of a first module in which each lower miniheader and each miniskein is oriented in a direction transverse to the longitudinal axis of the aerator box. In the embodiment illustrated, open upper ends of each miniskein's fibers are loosely held between two adjacent tines of a comb, so that the upper ends of fibers of successive miniskeins are separately confined between successive pairs of tines of the comb. The upper ends are all then potted in an integral upper header for withdrawal of permeate from the upper header (upper header configuration (ii) above). The width and length of the aerator box are each the same as those of the upper header so that the footprint of each is the same.

Upper header configuration (i) referred to above, is not illustrated because it would be indistinguishable in the illustration from FIG. 1.

Figure 4:
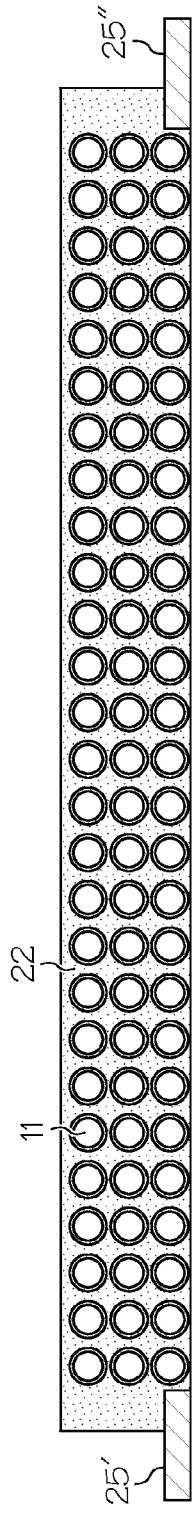
FIG. 4 is a cross-sectional plan view, of a three-array lower miniheader with individual rigid mounting tabs or "stub-strips", at each end of the miniheader, showing ends of 27 fibers in each of three congruently overlaid arrays adhered together with no fiber-mounting strip. If desired, an upper miniheader may be assembled in an analogous manner for use in a zig-zag potted configuration in the upper header.

Referring to FIG. 1 there is illustrated a module, generally referred to by reference numeral 10, in which a skein of fibers, individually and collectively referred to by reference numeral 11, are disposed between an open slotted box 12 and an upper header 14, each having the same planar area (or footprint), each being elongated and preferably an essentially rectangular parallelpiped. The aerator box 12 holds multiple miniskeins 20 having lower miniheaders 23 (not visible in FIG. 1, but see FIGS. 3, 4 and 4A) in each of which, arrays of fibers on each side of a mounting strip 21 (not visible in FIG. 1, but see FIG. 5), have the lower portion 13 of each fiber, spaced-apart in a planar ordered array; the terminal ends of the lower portions 13 are plugged and non-movably adhesively secured, to the strip 21. Though a very large array may have as many as 250 fibers for a box having a very large area, each array in a miniskein for ultrafiltration of water preferably contains from 20-150 fibers.

The terminal ends of the upper portions 15 of the fibers 11 are held in a comb (not visible) which maintains the spatial relationship of the fibers in the arrays when they are potted in the upper header. The comb functions to gather upper portions 15 of the fibers of each miniskein, and keep fibers of adjacent miniskeins separated, and in parallel relationship in the y-z plane at right angle to the x-axis, before all upper portions are potted and integrated to form a unitary upper header 14, so that the terminal upper ends of the fibers are open to discharge permeate which is withdrawn through a permeate line 16.

Less preferably, instead of a comb, the terminal upper ends may be suspended from the lower miniheaders so as to maintain approximately the same V-shaped configuration which will be less clearly defined than the configuration of each miniskein in the aerator box 12. When the upper portions 15 of the fibers of each miniskein are so collected and the terminal upper ends of the fibers potted in closely spaced-apart but random relationship in the unitary upper header 14, the collected upper portions 15 of the fibers are fixed approximately directly above the lower portions 13 of the corresponding miniskeins held in the slots 17 and 18 beneath. Though the locations of the upper portions 15 are random, that is, in no geometric pattern of an array when the upper ends are potted, all the upper portions 15 of each miniskein hang vertically without intersecting adjacent fibers of the miniskein.

The open box 12 serves to hold multiple miniskeins 20 which are frictionally held but freely slidable, up-and-down, over the height of vertical, preferably angulated slots 17 cut in the opposed front 32 and rear 34 longitudinal walls of the aerator box, so as to hold equiangulated pairs of miniskeins in the box (as shown for another module in FIG. 3). Though equiangulation is preferred, it is not narrowly critical as long as angulation in the stated range is maintained between successive lower miniheaders.

Figure 5:
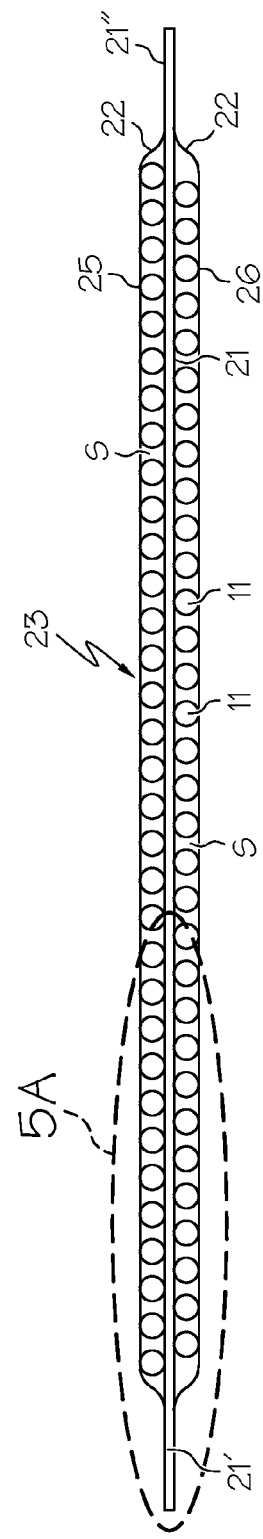
FIG. 5 is a cross-sectional plan view, taken just above a mounting strip, of a minimal twin-array miniskein with a different number of arrays, interdigitated and adhesively secured to the strip, back-to-back, on each side of the mounting strip.

Twenty (20) vertical angulated slots 17 are shown on the facing side of the aerator box 12 (visible in FIG. 1); there are twenty-one (21) vertical angulated slots 17' (not visible in FIG. 1) cut in the opposite longitudinal side (also not visible). The slots have the opposed terminal edges 21' and 21" of mounting strips 21 (as shown in FIG. 5) of adjacent miniskeins 20 slidably inserted in the corresponding slots 17 and 17' of the aerator box 12 so that when the miniheaders 23 are inserted they present a zig-zag configuration. An aerator box may have more or less slots, depending upon the number of lower miniheaders which are to be mounted in the box.

For clarity, minimal twin-array miniskeins 20, are shown in FIGS. 1-3A, 5 and 5A; each has only one array on each side of a mounting strip 21 and opposed terminal ends 21' and 21". These opposed ends 21' and 21" of two mounting strips 21 of two lower miniheaders 23 (see FIG. 5), are each inserted in adjacent slots 17 in the front wall of the box 12, so that the adjacent miniskeins form a vertex; and one opposite end 21" of each mounting strip 21 is each inserted in spaced-apart slots 17' (not visible in FIG. 1, but see FIG. 3 showing slots 57' in a similar aerator box) in the opposite longitudinal side of the box. Two adjacent miniskeins 20, each with terminal ends 21', so held, form a V, the arms of which form an angle θ in the range from 1° to 25°. This sequence is repeated so that there is a succession of angulated pairs of miniskeins 20 in each side of the aerator box 12 (as shown in FIG. 3, for a second module). It will be evident that as the angle gets wider than 25°, the alternate terminal ends of each miniheader 23 are separated further, more rapidly than with a narrower angle, so that even miniskeins at 25°, each having only 100 fibers in an array, will result in the skein having an unacceptably low effective packing density.

It will also be evident that the zig-zag configuration of the miniskeins need not be restricted to being equiangulated, that is, having the same angle θ, but it is convenient and practical to do so.

The terminal lower ends of the lower portions 13 of fibers 11 are plugged so that each miniskein 20 is dead-ended. Permeate may be withdrawn from the permeate withdrawal line 16 of the upper header 14 only. The open-bottomed V formations of the lower miniheaders serve to provide space for scrubbing air bubbles in the size range from 0.1-10 mm, or even larger, to rise between the fibers; and also through the spaces between miniskeins through which solids in the waste water being filtered, can fall. An end face of the aerator box 12 is provided with a pair of through-apertures 19 for attaching the box to a rack (not shown) in which multiple modules 10 are typically mounted.

Since the lower miniheaders of miniskeins with relatively taut fibers are confined in the vertical slots, the limits swayability of the fibers, from side-to-side, is limited. Thus confined, the mid-point of a miniskein having fibers 100.5 cm long (between miniheaders), and the fibers are 0.5% longer a the vertical distance of 1 m between the headers, the mid-point will sway 5 cm in either direction from the vertical (measured along an axis at right angle to the skein). The mid-point of a miniskein having fibers 105 cm long (between miniheaders), and the fibers are 5% longer than the vertical distance of 1 m between the headers, the mid-point will sway 15 cm in either direction from the vertical. Such minimal swaying is insufficient to cause serious damage to the fibers when they rub against each other even when upper limits of air pressure and volume are employed.

Excessive rubbing action may help shed solids and particulate matter into the wastewater but, over time, also causes abrasive wear on the surfaces of the fibers, resulting in leakage of the fiber. The zig-zag configuration of at least the lower miniheaders allows the use of a relatively small amount of air at low pressure, resulting in more efficient filtration with a corresponding savings in operating costs. Where shrinkage, referred to above, decreases fiber length to as little as 95% of their original length, the movably secured lower miniheaders accommodate such shrinkage without unduly stressing the fibers.

Assembling a Miniheader:

A first embodiment of a miniheader 23 (see FIG. 5) is assembled as follows: A continuous length of fiber is fed from a feed-roll over an intermediate roller and onto a cylindrical skein-building roller (hereafter "sb-roller" for brevity, not shown) the diameter of which provides a circumference 'C' the length of which corresponds to the length of fibers to be used in each array. The side-to-side movement of the intermediate roller is controllable to provide the desired spacing 's' of the wound fiber on the sb-roller. When fiber is wound onto the surface of the sb-roller in cooperation with the intermediate roller, successive loops of the fiber are spaced apart on the sb-roller, in a circumferential layer, at the desired fiber-spacing 's', each loop being in a plane essentially orthogonal to the longitudinal axis of the sb-roller. When the surface of the sb-roller is covered with wound-on fiber, rotation of the sb-roller is stopped and the fiber from the feed roll is cut. A strip of meltable adhesive is placed over and across the fibers, along the longitudinal axis of the sb-roller, and then a mounting strip is placed and pressed onto the adhesive. Thus, when the wound fiber on the sb-roller is divided into multiple miniskeins, from 5-10 on a typical sb-roller, a single array is adhered to one face of the mounting strip of each miniskein to be made.

To adhere a second array on the mounting strip, the fiber from the feed-roll is positioned on one end of the mounting strip and the sb-roller is rotated, again in cooperation with the intermediate roller, winding the continuous fiber over the mounting strip on the sb-roller, until, as before, the entire surface of the sb-roller is covered with the wound fiber as the desired spacing 's'. Near the end of the sb-roller, the rotation of the sb-roller is stopped and, as before, a strip of meltable adhesive pressed onto the wound fiber before the continuous fiber is cut.

Multiple minimal miniskeins, each having two arrays, one adhered on each side of the mounting strip (see FIG. 5) are made when the wound fiber is cut from the sb-roller.

To provide multiple arrays on a mounting strip, the continuous fiber from the feed-roll is wound onto the surface of the sb-roller forming a first layer, as before, and a strip of meltable adhesive pressed onto the wound fiber before the continuous fiber is cut. The process is repeated by winding a second circumferential layer over the first layer, again in cooperation with the intermediate roller providing the desired spacing 's', until the last loop of the first layer is covered with the continuous fiber. As before, a strip of meltable adhesive is pressed onto the wound fiber before the continuous fiber is cut. The process is repeated if a third array is to be formed to provide a three-array miniskein, and then a mounting strip is pressed onto the adhesive. When the wound fiber is cut along the length of the sb-roller, multiple three-array miniskeins are formed, each with a miniheader, and arrays on only one side of the mounting strip.

To provide a six-array miniskein with three arrays on each side of a mounting strip (as shown in FIG. 7), after the three-array miniskeins are formed on the sb-roller, and before they are cut from the surface of the sb-roller, the fiber from the feed-roll is again wound onto the mounting strip, again in cooperation with the intermediate roller providing the desired spacing 's', until the last loop of the first layer is covered with the continuous fiber. As before, a strip of meltable adhesive is pressed onto the wound fiber before the continuous fiber is cut. The process is repeated for the fifth and sixth arrays. When the wound fiber is cut along the length of the sb-roller, multiple six-array miniskeins are formed.

Successive arrays, overlaid back-to-back, form a stack in which fibers of each array may be either congruently overlaid over the fibers of the array beneath it, or, interdigitated between fibers of an array beneath it, providing a chosen lateral spacing between fibers, the stack having a desired packing density. Arrays are separated only by the thickness of the adhesive securing the fibers, and that of the fiber mounting strip (when used).

A preferred adhesive is a strip of a meltable (or "hot-melt") adhesive such as commercially available "EVA" which is placed over the fibers and heat-melted to secure the fibers in an array, on the roller. Another useful adhesive is a strip of liquefiable synthetic resinous material which may be liquefied sonically with high-intensity sound waves. Still another adhesive is a viscous resinous quick-curing liquid adhesive, preferably having a viscosity in the range from about 1,500-10,000 cP (1.5-10 mPa·sec) at 20° C.

After excess length is cut from the fibers, the terminal ends of the lower portions of the fibers are dipped in plugging or potting liquid (e.g. polyurethane) and dried to plug the ends. The miniskein so formed, with a single miniheader and fibers with loose ends, is dipped in a tank of post-formation treatment solution such as aqueous glycerine, and dried. A miniheader preferably has from 10-250 fibers in each array, most preferably from 25-100 depending upon the diameter of the fibers and the fluid to be filtered.

Successive arrays on the strip are longitudinally (i.e. along the x-axis in a miniheader held in the vertical y-z plane) closely spaced apart, one array relative to the array beneath it. This thickness is preferably in the range from about 0.1-2 mm or 0.05 d-1.0 d, depending in part upon 'd'. Each miniskein most preferably comprises no more than 6 arrays. Though the number of arrays on each side of the strip (when used) may be the same or different, most preferred for a six-array miniskein is 3 arrays on each side of a mounting strip.

In the first embodiment of a miniheader, the lower miniheader is mounted in the box with integral mounting means or tabs provided by the opposed ends of the fiber-mounting strip. If desired, the upper portions of arrays of the miniskein may be analogously overlaid on an upper mounting strip to form an upper miniheader which would then be potted in a desired configuration in an upper header.

The second embodiment of a miniheader is without a mounting strip. The strip is replaced with opposed, separate, individual stub-strips to be positioned on each side of the miniheader. The second embodiment of a miniheader is assembled as follows: Stub-strips 25' and 25" (see FIG. 4) are placed on the surface of a sb-roller with a non-stick surface onto which is wound continuous fiber from a feed-roll, as described above, and the successive layers of fiber adhered to each other and the stub-strips.

When the miniheader, assembled as described immediately above, is used as a lower miniheader, if desired, the upper portions of fibers in the arrays of the miniheader may be analogously overlaid on opposed stub-strips to form an upper miniheader with opposed integral mounting tabs. The miniheaders may then be potted in a desired configuration in a vertically slotted potting pan of an upper header.

The third embodiment of a miniheader is without a mounting strip and without stub-strips. In this embodiment, a miniheader is assembled as follows: A continuous fiber is wound onto the non-stick surface of a sb-roller in cooperation with an intermediate roller to form a first layer of wound fiber onto which a strip of meltable adhesive is pressed. The continuous fiber is cut, and a second layer of fiber is wound onto the sb-roller, directly above the first wound layer, and a strip of meltable adhesive is pressed onto it before the fiber is cut. Additional layers of fiber may be wound onto the sb-roller, each being adhered to the one beneath it, as before, to form a stack of fibers which is cut from the sb-roller to provide multiple miniheaders without a mounting means.

Before each miniheader is mounted in slotted box 48 or 48' (see FIGS. 14 and 14A), the arms of T-shaped mounting pins 66', 66" are inserted behind end arrays (see FIG. 7A), near each end of the miniheader, to provide a mounting means to mount the miniheader in the box. The mounting pins are preferably adhesively secured within the miniheader.

If plural, similar upper miniheaders are to be potted in a desired configuration in an upper header, each upper miniheader is analogously formed, and T-pins inserted, preferably non-removably, near the opposed ends thereof to mount the upper headers in a potting pan before the headers are potted.

The percentage of fibers in a stack which are surrounded by other fibers has a direct effect on the performance of a miniskein—the higher the percentage surrounded, the worse the performance. As an illustration, a mounting strip with one array on each side (a minimal miniskein), and no overlapping arrays, as illustrated in FIG. 5 has no (0%) fibers which are surrounded by other fibers irrespective of the width (measured along the y-axis) of the miniskein. A mounting strip with three arrays on each side of a strip, each array with only 14 fibers (see FIG. 13), has 32 fibers which are in open, unimpeded contact with the substrate to be filtered the remaining 52 being surrounded by other fibers; i.e. 52/84=61.9% are surrounded. The more the fibers in each array, the higher the percentage of fibers that are surrounded by other fibers; because more than six (6) arrays in a miniheader provide no proportionate increase in performance of the module, preferably not more than 3 arrays on a first prior array, are secured to one side of the mounting strip. A miniskein having more than about 65% of its fibers surrounded, usually shows no improvement in long-term performance as it is more readily fouled and less readily cleaned. The foregoing illustrative calculation for surrounded fibers is not affected by the presence of the strip.

Figure 2:
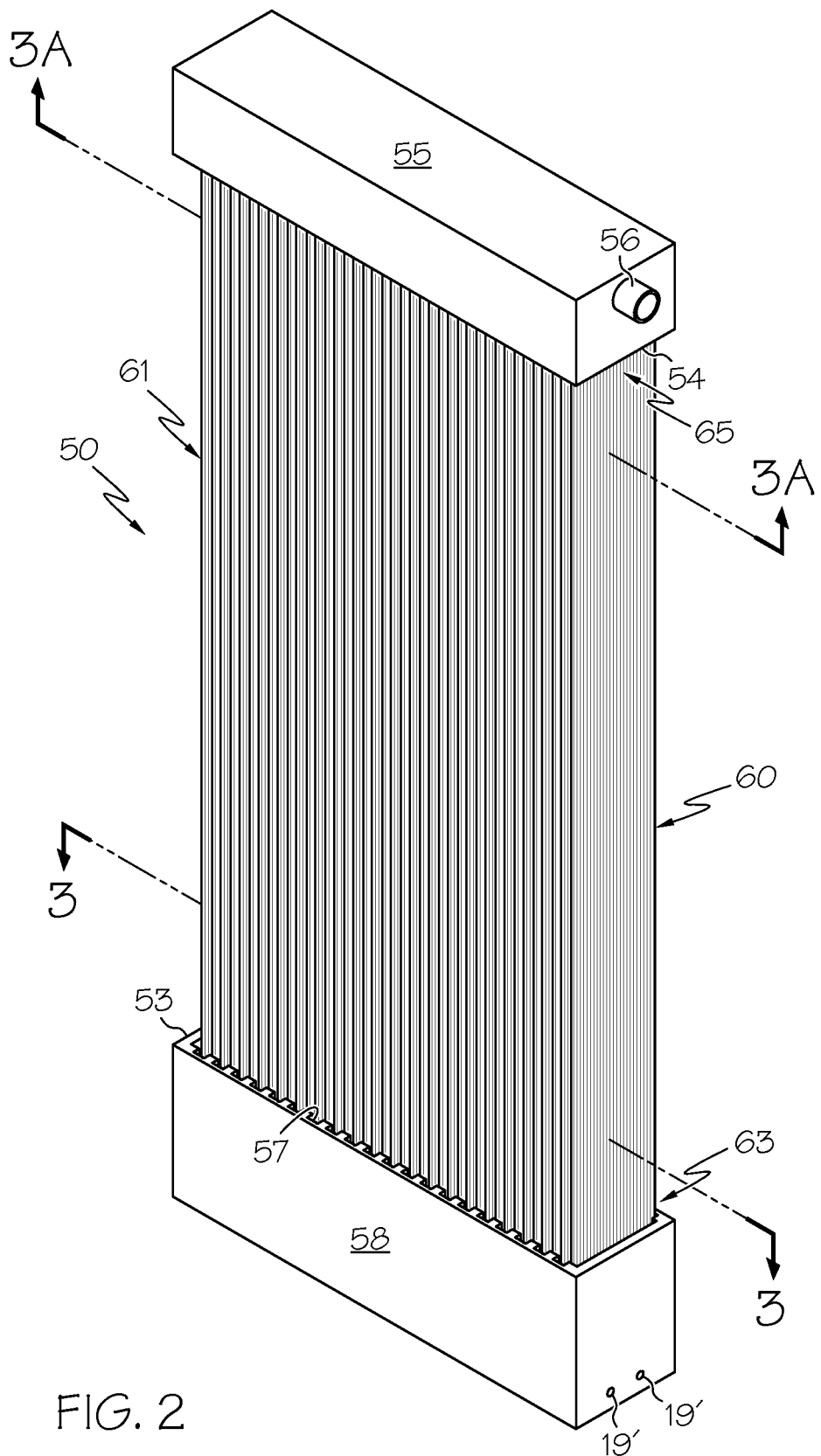
FIG. 2 is a perspective view of a second module in which fibers, are arranged in arrays with lower miniheaders, as in FIG. 1, but the upper portions of the fibers in each miniskein are secured in an upper miniheader similar to the miniskein's lower miniheader. The footprint of the upper header is smaller in area than that of the lower header.

Illustrated in FIG. 2 is a second module 50, with miniskeins 60 mounted in a slotted box 58 which is 10% wider and 15% longer than upper header 55 (differences in dimensions are not visible in the FIG. 2). Lower portions 63 of fibers 61 in each miniskein 60 are assembled, secured on mounting strips 21 in lower miniheaders 53 (not visible in FIG. 2), and the ends of the fibers 61 plugged, as described for the lower miniheaders in FIG. 1. The lower miniheaders 53 are mounted in zig-zag configuration in slots 57 and 57' (not visible in FIG. 2) in opposed sides of the box 58, the adjacent miniheaders forming an angle θ in a manner analogous to that described above. Through-apertures 19' are provided to mount the box in a cage or cassette for deployment in a tank.

To provide an upper header configuration (iii), described above, the upper portions of fibers 61 are assembled and secured on mounting strips 21 (see FIG. 5) in upper miniheaders 54 (not visible in FIG. 2) similar to the lower miniheaders 53. The upper miniheaders 55 are mounted in parallel, spaced-apart relationship with each other, in adjacent vertical slots (y-z planes) in opposed walls of a potting pan ("slotted potting an") and potted integrally in upper header 55 for withdrawal of permeate through withdrawal line 56 (as in FIG. 8). The dark lines on the lower vertical face of the module shown in FIG. 2 indicate (i) that the fibers of arrays in successive miniskeins maintain their zig-zag configuration for a major portion of the distance to the upper header, and (ii) that, as the fibers near the upper miniheader, they conform to the orthogonal orientation of the parallel upper miniheaders in configuration (iii).

To provide a third module similar to the second module shown in FIG. 2, but with an upper header configuration (iv), described above, illustrated in FIG. 3 is a slotted box 58' which is 10% wider and 15% longer than the upper header 55. Except for the 26.5% greater footprint, box 58' is analogous to the box 58 of the second module 50. The upper header 55, having configuration (iv), is illustrated in FIG. 3A with the box 58'.

Under the box 58' is positioned an air-diffuser (or one or more air-pipes) 40, as would be done when the modules shown in FIGS. 1 and 2 are in operation. The upper surface of the diffuser 40 is perforated with multiple through-apertures ("holes") 41 through which air, supplied through an air-supply line 42, is discharged between adjacent miniskeins 60 (not shown in FIGS. 3 & 3A, but similar to miniskeins 20). The amount of air, and the pressure at which it is supplied, is controlled, as needed, so as to provide (i) the required scrubbing of the surfaces of the fibers 61, and (ii) the amount required to re-direct air-scrubbed, falling solids so they collect under the air diffuser, not on it.

Illustrated in FIG. 3A is the upper header 55 with upper miniheaders 54 potted in slotted potting pan 51. The same identifying numerals are used for the upper header 55 as used for the upper header in FIG. 2 because the only difference between the two upper headers is that the one shown in FIG. 3A has upper miniheaders 54 mounted in a zig-zag configuration (not parallel as described in FIG. 2) in the potting pan 51 before they are potted. The zig-zag configuration of strip ends 21' and 21" of the lower miniheaders 63 in slots 57 and 57' is maintained in the unitary upper header 55, by inserting the strip ends 21 and 21' of the upper miniheaders 54 of each miniskein 60, into slots 67 and 67', before the upper miniheaders are potted. The resulting zig-zag configuration of miniskeins in the unitary upper header 55 is not a mirror image of the zig-zag configuration in the aerator box 58 because the included angles between successive lower miniheaders are larger than those in the upper header.

Figure 5A:
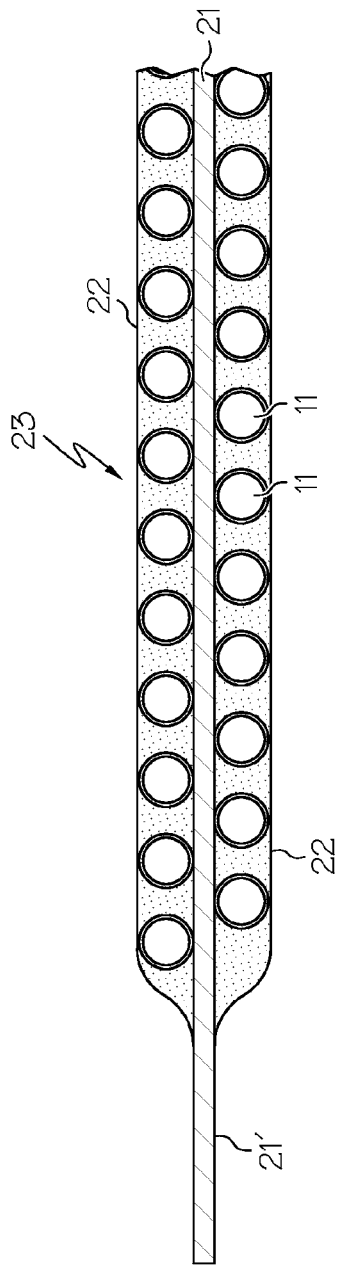
FIG. 5A is a detailed cross-sectional plan view of the portion 5A in FIG. 5, showing where a liquefiable adhesive when liquefied around fibers in each array to adhesively secures them to a mounting strip, and provides ends adapted to be inserted in slots of an aerator box.

Assembling a Miniskein:

Each miniskein 20 (a minimal miniskein having a miniheader with a single array on each side is illustrated in FIGS. 5 and 5A) is assembled using the simple procedure described above for assembling a miniheader on a sb-roller. This avoids manually placing and securing multiple fibers 11 on a mounting strip 21 on a table or other planar surface.

Mounting tabs, whether T-pins (see FIGS. 7A and 7B) or stub-strips 25' and 25" (see FIG. 4) are provided at opposed ends of a stack of arrays if no fiber-mounting strip is used. Mounting tabs at the opposed ends of the stack may also be provided if flexural rigidity of the strip is so low that the miniheaders cannot be securely held in the vertical slots of an aerator box or potting pan.

Illustrated in FIG. 5 is a miniheader 23 of a miniskein having 33 fibers positioned on one side of the mounting strip 21, each fiber separated from the other by 's', depending upon the diameter 'd' of the fibers, the aeration requirements of the skein, and the solids content of the substrate. The spacing template is placed just above the surface of the roller so that the fibers coming through the strip are guided onto the surface of the roller. Preferably, s>0.5 d but <3 d, where 'd' represents the outside diameter of a fiber. The greater the 's' the more open the skein, and the lower its effective packing density on the miniheader. The minimal twin-array miniskein so formed has only two arrays each of which may have the same number of fibers in each array on each side, or the number may be different; and the arrays may be on a single face of the fiber-mounting strip 21.

A second array (as illustrated in FIG. 6) may be overlaid on a first array on a miniheader, by repeating the process for placing and securing the prior, first array. The second array may be positioned with the spacing template directly above the prior first array, so that fibers of the second array are congruently overlaid on the adhesive directly above the fibers of the first array. For such one-on-one overlaying of arrays, each array typically has the same number of fibers as the prior array. For maximum packing density on the miniheader, the second array would have either one less, or one more, fiber than the first array, so that fibers of the second array may be located above and between fibers in the lower array, so that the lower ends of the fibers in each array appear to be effectively interdigitated. The number of arrays on each side of a mounting strip, or the mounting tabs, may be the same or different, as may be the number of fibers in each array.

Alternatively, to provide a miniskein with a miniheader having no fiber-mounting strip (second embodiment of a miniheader), but with stub-strips 25' and 25", the miniheader is assembled, as described above, placing the stub-strips at opposed ends of the to-be-assembled miniheader, and the end fibers adhesivey secured to the stub-strips. The upper portions of the fibers are then deployed in a desired upper header configuration before the upper portions of the miniskeins are potted.

Packing density $\delta_h$ of fibers in a miniskein is defined as the (total cross-sectional area of all the fibers in the miniskein, computed using the outer diameter of each fiber) divided by (the area occupied by a cross-section of the miniskein's miniheader). The packing density is generally stated as this fraction multiplied by 100. The packing density of the lower portion of a typical miniskein or a typical miniheader is >50%, preferably >70%.

The effective packing density ($\delta_{he}$) of fibers in an aerator box is in the range from 15%-38% depending upon the number of arrays on each side of a mounting strip, the diameter of the fibers and their spacing in the area of the box. Specifically, in a module of minimal (one array of 80 fibers on each side of a mounting strip) miniskeins, with fibers having an o.d. of 2.0 mm in a miniheader of 80 fibers spaced apart at a distance of 1.8 mm on mounting strips in an aerator box having an open cross-section of 1,511 mm² the effective packing density is 33.3%.

Illustrated in FIG. 5A is an enlarged end portion of the miniheader 23 showing fibers of an array on one side of the strip located intermediate fibers of an array directly opposite, on other side of the strip. The fibers could also be located directly opposite fibers on the other side of the strip. If a second array is positioned with second fibers located intermediate first fibers directly beneath them, though spaced apart by the thickness of the mounting strip, the two arrays are referred to as having fibers interdigitated with one another. When a second array of fibers is overlaid directly upon and superimposed upon a first array of fibers, though spaced apart by the thickness of the mounting strip, the second array is referred to as being congruent upon the first array.

FIG. 6 is a perspective view of a schematic illustration of a four-array miniskein 28 depicting the build-up on one side of a mounting strip 31, of two, first 27 and second 28 arrays, on one side of the strip 31, where after the first array 27 is positioned on the strip 31, and secured to it with a heat-melted, first adhesive ribbon 22 (not visible under the fibers of the second array after the ribbon is melted). A second array 28 is then congruently overlaid on the first adhesively secured array 27, and a second adhesive ribbon 22 is heat-melted over it (visible on top of the second array before the ribbon is melted). As illustrated in FIG. 6, each array with 36 fibers, has 38 open fibers, that is 34 of the 72 fibers on each side, or 47.2% are surrounded.

After the two arrays 27 and 28 are built up on the first side of the mounting strip 31 the strip is turned over and the same sequence of placing and securing two more arrays 27' and 29' is duplicated. For simplicity and clarity, only the build-up of the first two arrays on the first side of the mounting strip is illustrated. One end of a second adhesive ribbon 22 is shown behind the two secured arrays 27' and 29' in FIG. 6 to confirm that two congruent arrays corresponding to those shown on the front, were built up on the reverse side of the mounting strip 31. Though only the terminal portions, typically from 3%-7% of the overall length of the fibers between headers, are secured to the mounting strip and, the fibers are spaced-apart, one from another, the geometric regularity of the stacked arrays is maintained over a significant portion of the lower portion of the miniskein after it is positioned in the module.

Illustrated in FIG. 7 is a bottom plan view of a miniheader 24 in which the mounting strip 21 with ends 21' and 21", has three arrays of fibers 11 on each side, each array sequentially secured to the mounting strip with heat-melted ribbons of EVA film 22 so that the fibers of one array are located between fibers of an adjacent array. After the terminal ends of the fibers are plugged, the dead-ended arrays on the mounting strip constitute a lower miniheader 24 which is inserted and secured in a slot 17 or 18 so as to allow its vertical movement in the aerator box 12. As illustrated in FIG. 7, six (6) arrays, each with 36 fibers, three (3) arrays on each side of a mounting strip, with fibers of each array on each side separated by an adhesive ribbon, all fibers located congruently, one atop the other, has 40 open fibers on each side, that is 62.9% of the fibers are surrounded by other fibers. It is evident that as the ratio of surrounded fibers gets higher, the performance of the skein as a function of the membrane surface area deployed for filtration, gets progressively worse; better performance is obtained when less than 65% of fibers are surrounded.

Referring to FIG. 7A there is schematically illustrated, in plan view, the lower portion of a 6-array miniheader 64 with no mounting strip, showing lower portions of fibers 11 adhesively secured to each other in congruent arrays. Ribbons of melted adhesive 68' secure successive arrays, and the outermost layer of adhesive 68' confines all the arrays in a miniheader. Mounting means are provided by T-shaped pins 66' and 66" which are inserted so that the arms of the T are behind the end fibers of each array.

Illustrated in FIG. 7B is a perspective view of the miniheader 64 showing only the outermost ribbon of unmelted adhesive 68, before it is melted. The T-pins 66' and 66" would be inserted after the miniheader is assembled and cooled to room temperature. arrays are adhesively secured plural lower miniheaders 23' of miniskeins 20', each having only two planar ordered arrays on each side of a mounting strip 21' such as is shown in FIG. 5. The mounting strips 21' are successively alternated in vertical slots 17 and 18 of the aerator box 12', each pair forming the same angle, resulting in a uniform zig-zag configuration.

Figure 8:
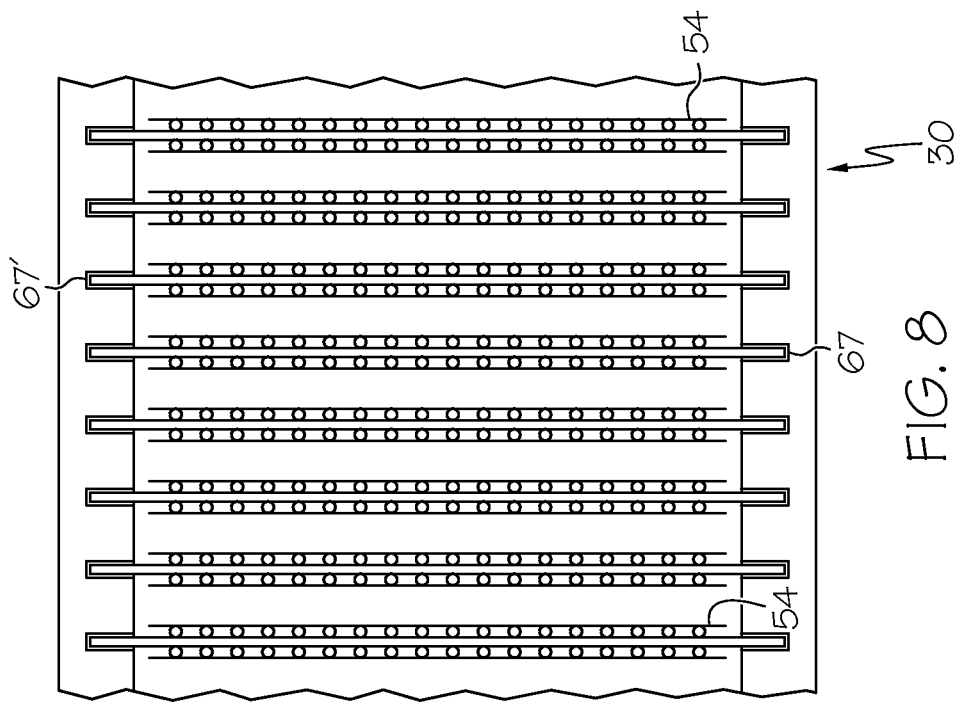
FIG. 8 is a plan cross-sectional view of an upper header, of a third module with ends broken off, wherein the upper header has the same width and length as an aerator box below; plural upper miniheaders of miniskeins, shown having twin arrays, are mounted in vertical slots in the upper header, in parallel relationship, each miniheader lying in the y-z plane at right angle to the longitudinal x-axis of the upper header and the aerator box.

Illustrated in FIG. 8 is a plan cross-sectional view of an upper header 30 of a third module, the upper header having the same width and length as an aerator box below it; plural upper miniheaders 54 of miniskeins having twin arrays, are mounted in vertical slots 67 and 67' in opposed walls of the upper header 30, with miniheaders 54 in parallel relationship, each miniheader lying in the y-z plane at right angle to the longitudinal x-axis of the upper header 30 and aerator box 31.

Figure 9:
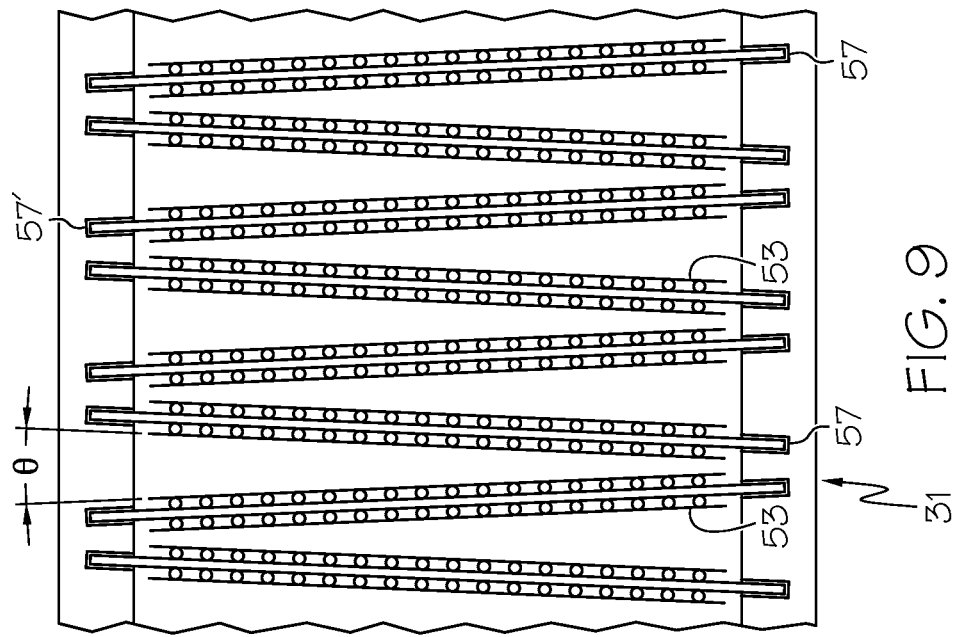
FIG. 9 is a plan cross-sectional view of an aerator box, with ends broken off, of the third module, the box having the same width and length as the upper header in FIG. 8; plural lower miniheaders of the twin-array miniskeins, in a zig-zag configuration, are mounted in individual, angled vertical slots in the box, so that each miniskein lies at an angle to an adjacent miniskein.

Illustrated in FIG. 9 is a plan cross-sectional view of an aerator box 31 having the same width and length as the upper header 30 of the third module; plural lower miniheaders 53 of the twin-array miniskeins are mounted in angled vertical slots 57 and 57' in the box, in a zig-zag configuration so that each miniskein lies at an angle to both the vertical x-z plane, and the vertical x-z plane orthogonal to the x-z plane, and the included angle between adjacent miniskeins in a particular example is about 4°.

Figure 10:
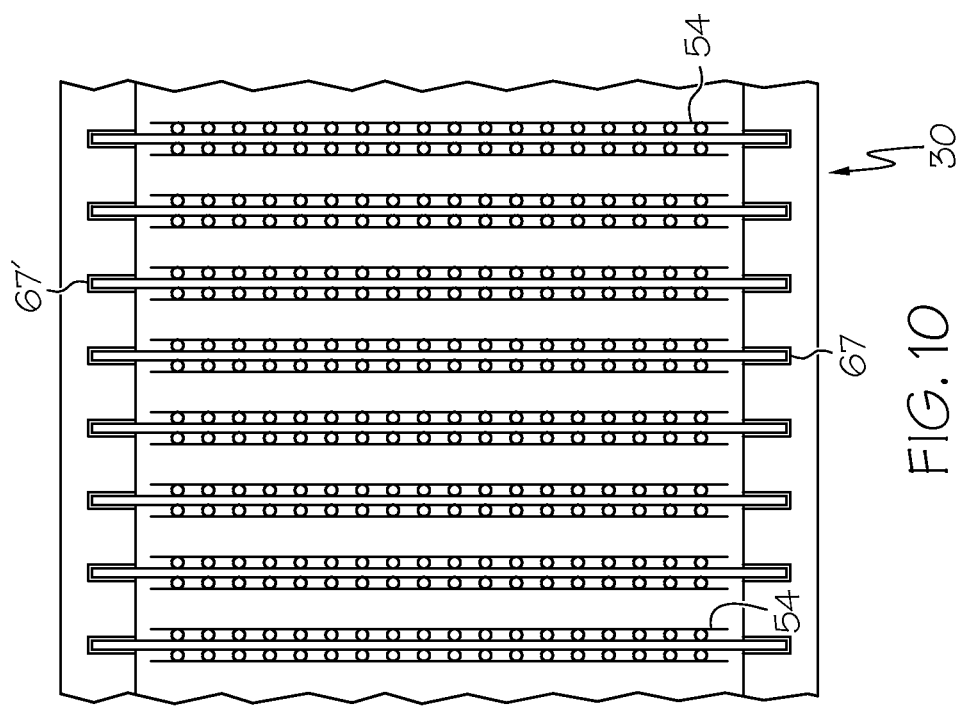
FIG. 10 is a plan cross-sectional view of an upper header, with ends broken off, of a fourth module, having the same width but 25% smaller length than an aerator box below it (see FIG. 11); plural upper miniheaders of miniskeins having twin arrays, are mounted in individual vertical slots in the upper header, in parallel relationship, each miniheader lying in the y-z plane at right angle to the longitudinal x-axis of the box.

Illustrated in FIG. 10 is a plan cross-sectional view of an upper header 30 of a fourth module, the upper header having the same width but 25% smaller length than a box below; plural upper miniheaders of miniskeins having twin arrays, are mounted in vertical slots 67 an 67' in opposed walls of the upper header 30, in parallel relationship, each miniheader lying in the y-z plane at right angle to the longitudinal x-axis of the upper header 30 and the box 33.

Figure 11:
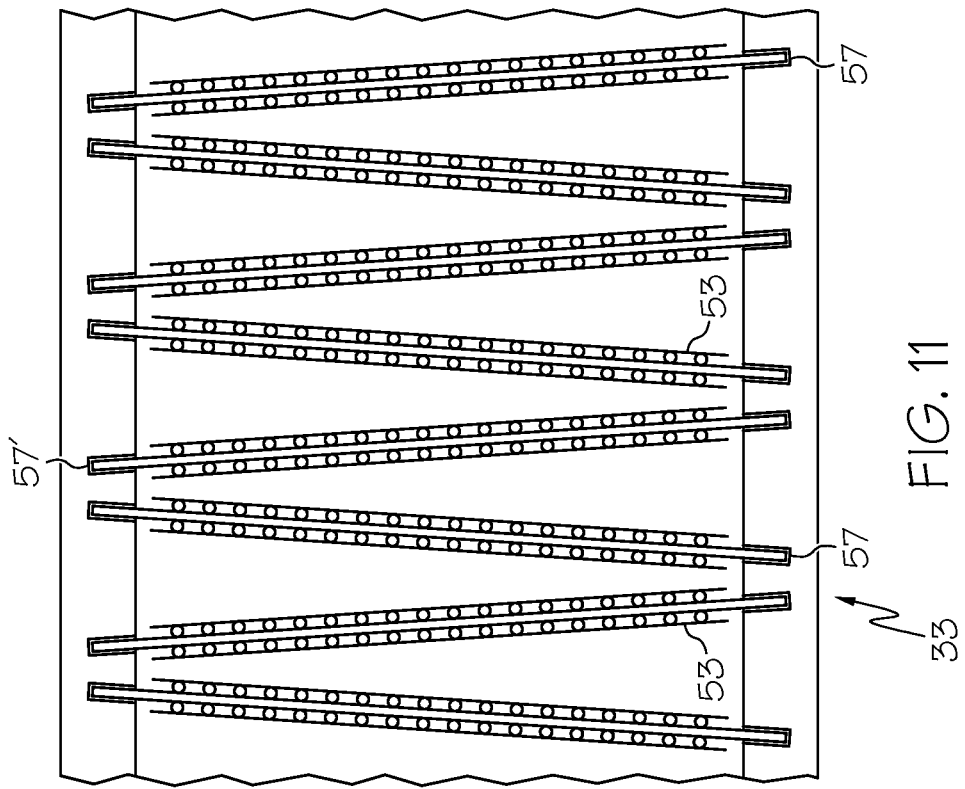
FIG. 11 is a plan cross-sectional view of the fourth module, with ends broken off, of an aerator box having the same width, but 25% longer length than the upper header (see FIG. 10); plural lower miniheaders of the twin-array miniskeins, in zig-zag configuration with included angle θ, are mounted in individual angled vertical slots in the walls of the box.

Illustrated in FIG. 11 is a plan cross-sectional view of an aerator box 33 of the fourth module, the box having the same width but 25% longer length than the upper header 30; plural lower miniheaders 53 of the twin-array miniskeins are mounted in angled vertical slots 57 and 57' in opposed walls of the box 33, in a zig-zag configuration so that adjacent miniskeins lie in a V having a greater included angle between adjacent miniskeins, than the included angle between miniskeins in a box having the same width and the same length as the upper header.

Illustrated in FIG. 12 is a top plan view of the aerator box 58, showing the angulated vertical slots 57 in the front longitudinal wall 32, and slots 57' in the opposed wall 34 with an included angle θ between adjacent slots. Opposed end walls are broken away and not visible. The box is open on top and open at the bottom.

Illustrated in FIG. 13 is a bottom plan view of an upper header 46 having the same width but 25% smaller length than an aerator box 48 below (shown in FIG. 14); plural upper miniheaders of miniskeins 24, each having six arrays, three congruent arrays on each side of a mounting strip, are mounted in vertical slots 67 and 67' in the front 44 and rear 45 walls of the upper header 46, in parallel relationship, each miniheader lying in the y-z plane at right angle to the x-z plane and longitudinal x-axis of the header 46, and of the box 48 below.

Figure 14A:
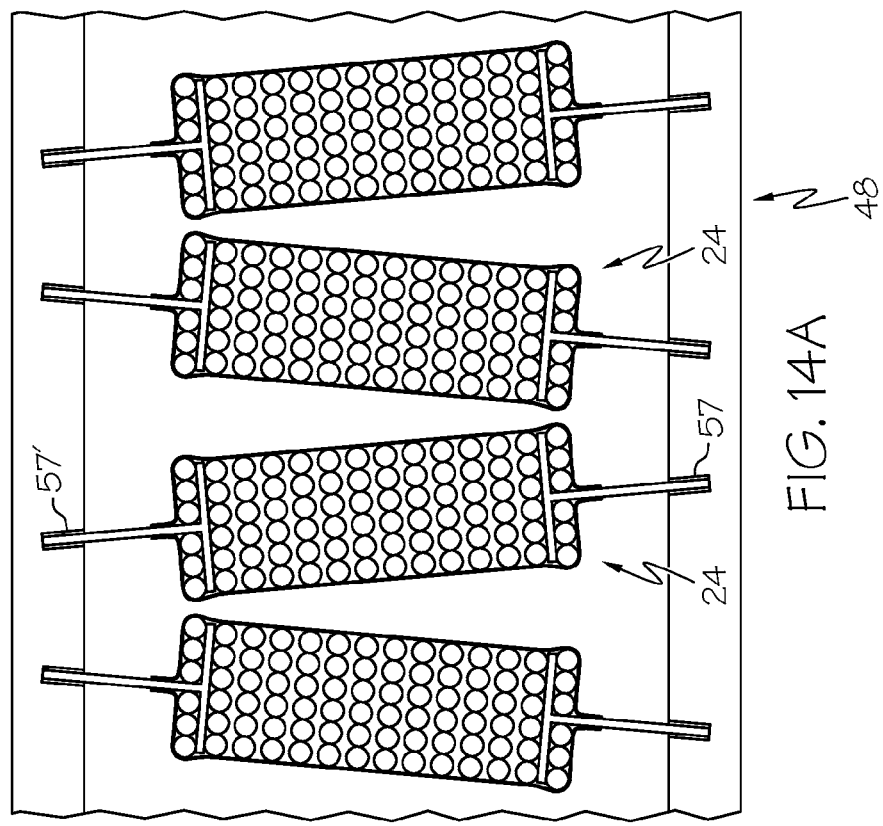
FIG. 14A is a plan cross-sectional view, with ends broken off, of an aerator box of a fifth module having the same width but 25% longer length than its upper header above with multiple miniskeins, as in FIG. 14, but with preformed lower miniheaders which are mounted with inserted T-pins, in vertical angulated slots in the walls of the box, in a zig-zag configuration so that, as in FIG. 14, adjacent miniskeins lie in a V having a greater included angle than the included angle of a configuration in a box having the same length.
Figure 14:
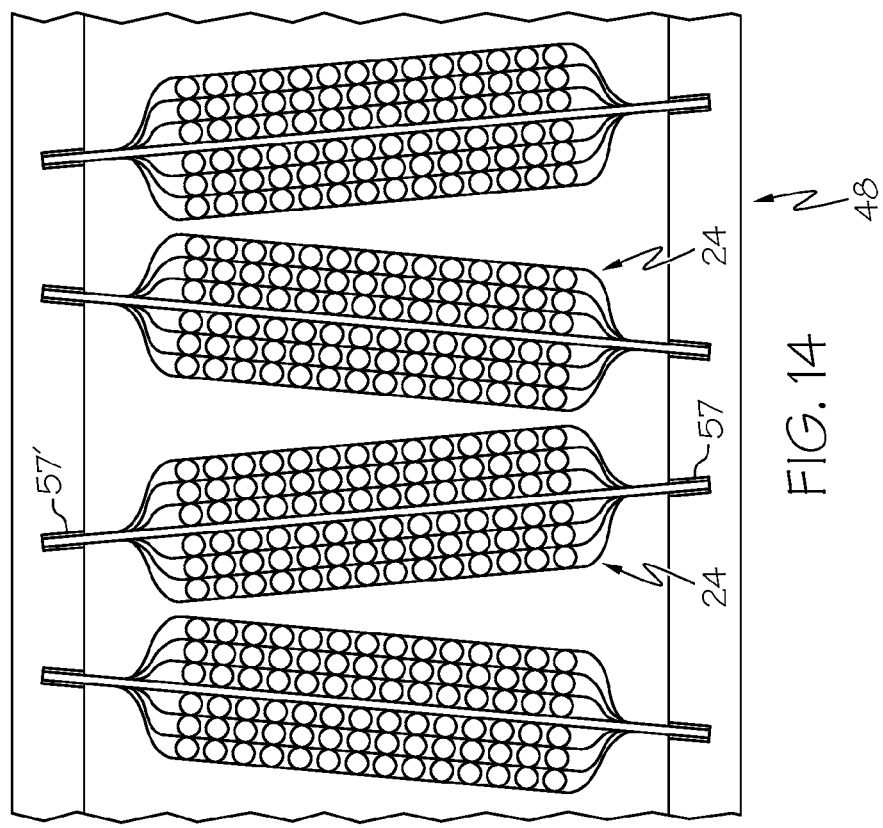
FIG. 14 is a plan cross-sectional view, with ends broken off, of an aerator box having the same width but 25% longer length than the upper header above (see FIG. 13); lower miniheaders of each six-array miniskein are mounted in vertical angulated slots in the walls of the aerator box, in a zig-zag configuration so that adjacent miniskeins lie in a V having a greater included angle θ than they would in a box having the same length as the upper header.

Illustrated in FIG. 14 is a plan cross-sectional view of an aerator box 48 having the same width but 25% longer length than an upper header 46 above it and plural six-array upper miniheaders 24' having congruent arrays on a mounting strip mounted in a zig-zag configuration, in vertical angulated slots 57 and 57' in opposed walls of the box 48.

Illustrated in FIG. 14A is a plan cross-sectional view of an aerator box 48' having the same width but 25% longer length than an upper header 46 above it and plural six-array upper miniheaders 64 mounted with inserted T-pins in a zig-zag configuration, in vertical angulated slots 57 and 57' in opposed walls of the box 48'.

Figure 15:
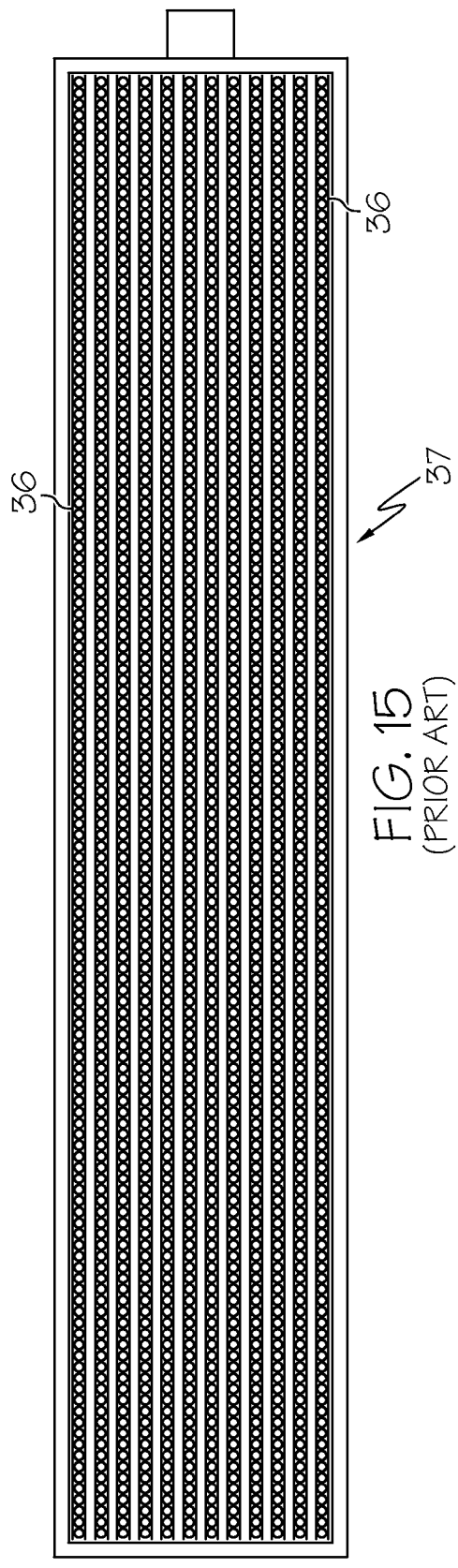
FIG. 15 is a plan view of the lower face of the '014 upper header having the same width and length as that of a group of four (4) potted sub-bundles of fibers in a group of headers (see FIG. 16), below the upper header in which each of sixteen (16) layers of groups of fibers in arrays, lie in the x-z plane co-directionally with and parallel to the longitudinal x-axis; the arrays are fixed in fixing liquid and attached to the header pan functioning as the upper header.

Illustrated in FIG. 15 is a plan view of the lower face of an upper header 37 in which arrays 36 of fibers are potted. The header 37 includes 16 arrays (only 12 are shown) potted in arrays, in parallel relationship, each array lying in the x-z plane co-directionally with and parallel to the longitudinal x-axis.

Figure 16:
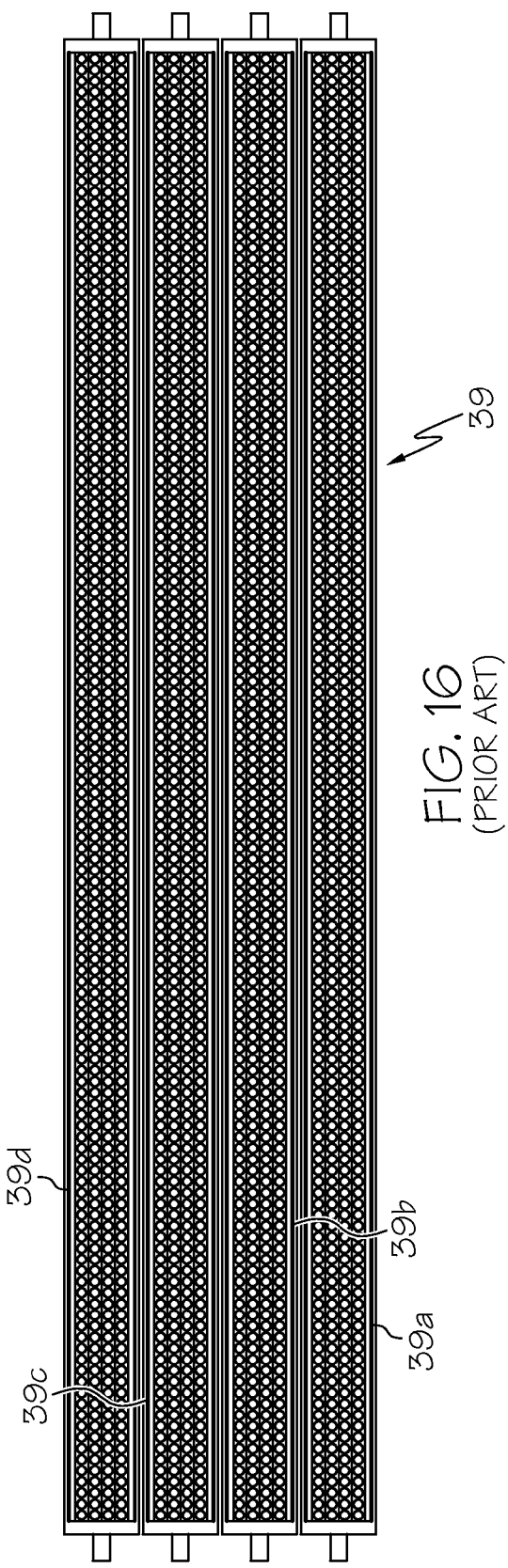
FIG. 16 is a plan view of four (4) transversely spaced-apart (spaced along the y-axis) sub-bundles of the layered groups of fibers fixed in fixing liquid and attached to a pan, as shown and described in the '014 application.

Illustrated in FIG. 16 is a plan view of four transversely spaced-apart (spaced along the y-axis) sub-bundles 39a-39d of arrays in a composite lower header 39, each sub-bundle with a large number of fibers, having four (4) planar arrays potted in its own lower header. The upper header 37 has the same width and length as that of the composite header 39. The sub-bundles are potted individually and spaced apart (along the y-axis) laterally, to form the composite lower header 39.

Figure 17:
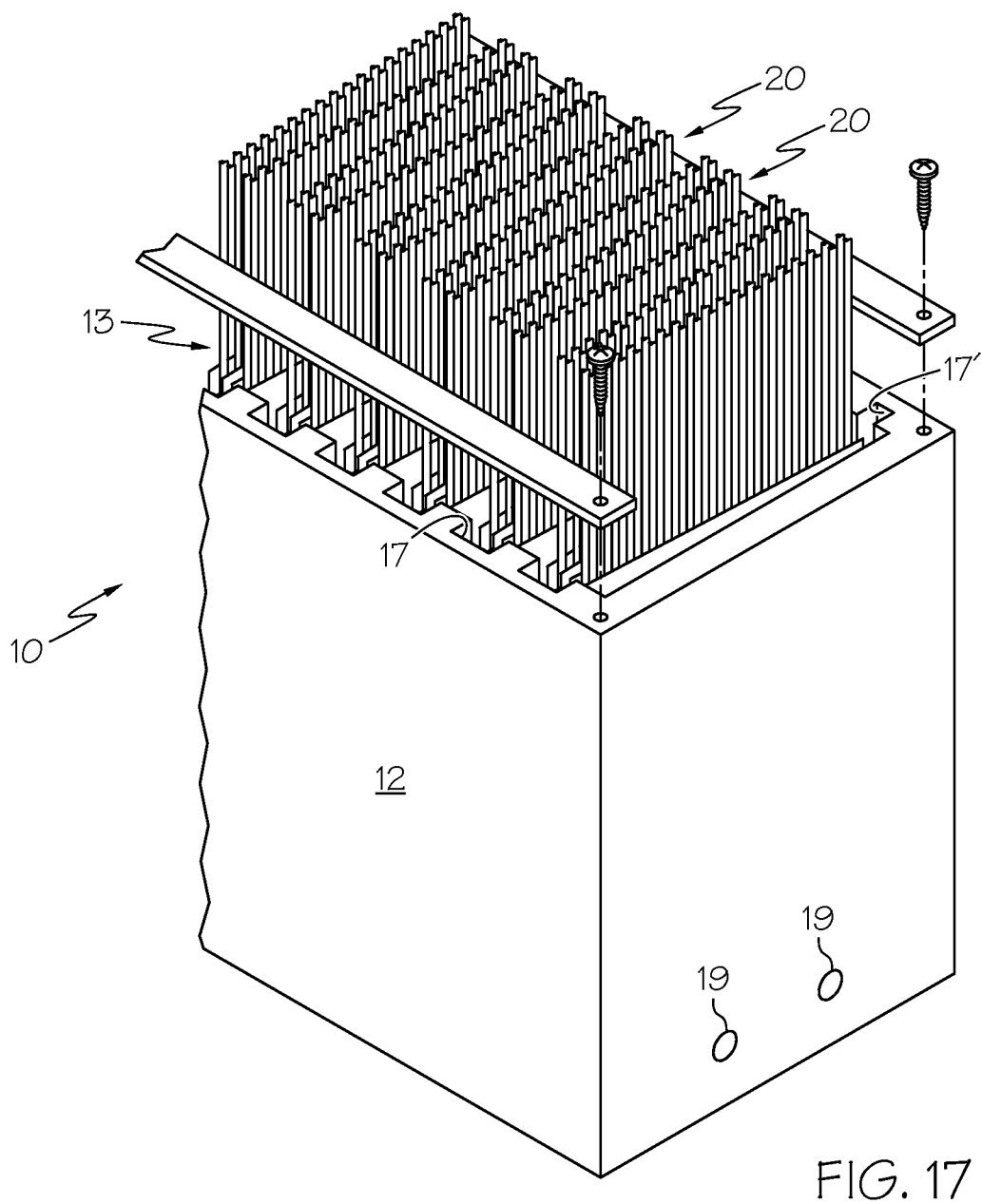
FIG. 17 is a perspective view of a broken off end portion of an open aerator box, end-capped at both ends.

Referring to FIG. 17, there is illustrated a perspective, broken away view of the box 12 of the module 10, after all the twin-array miniskeins 20 have been inserted in slots 17 and 17', in the walls of the box 12, in a successive, alternating, equiangulated, zig-zag configuration. Keeper strips 71 and 71' are fastened with screws 72 to the upper surfaces of the walls of the box to prevent the miniheaders from being forced out of their slots by air used to scrub the fibers. The terminal upper portions (not shown) of the upper portions of the fibers of each miniskein are separated from fibers of an adjacent miniskein and potted as described for FIG. 1.

Figure 18:
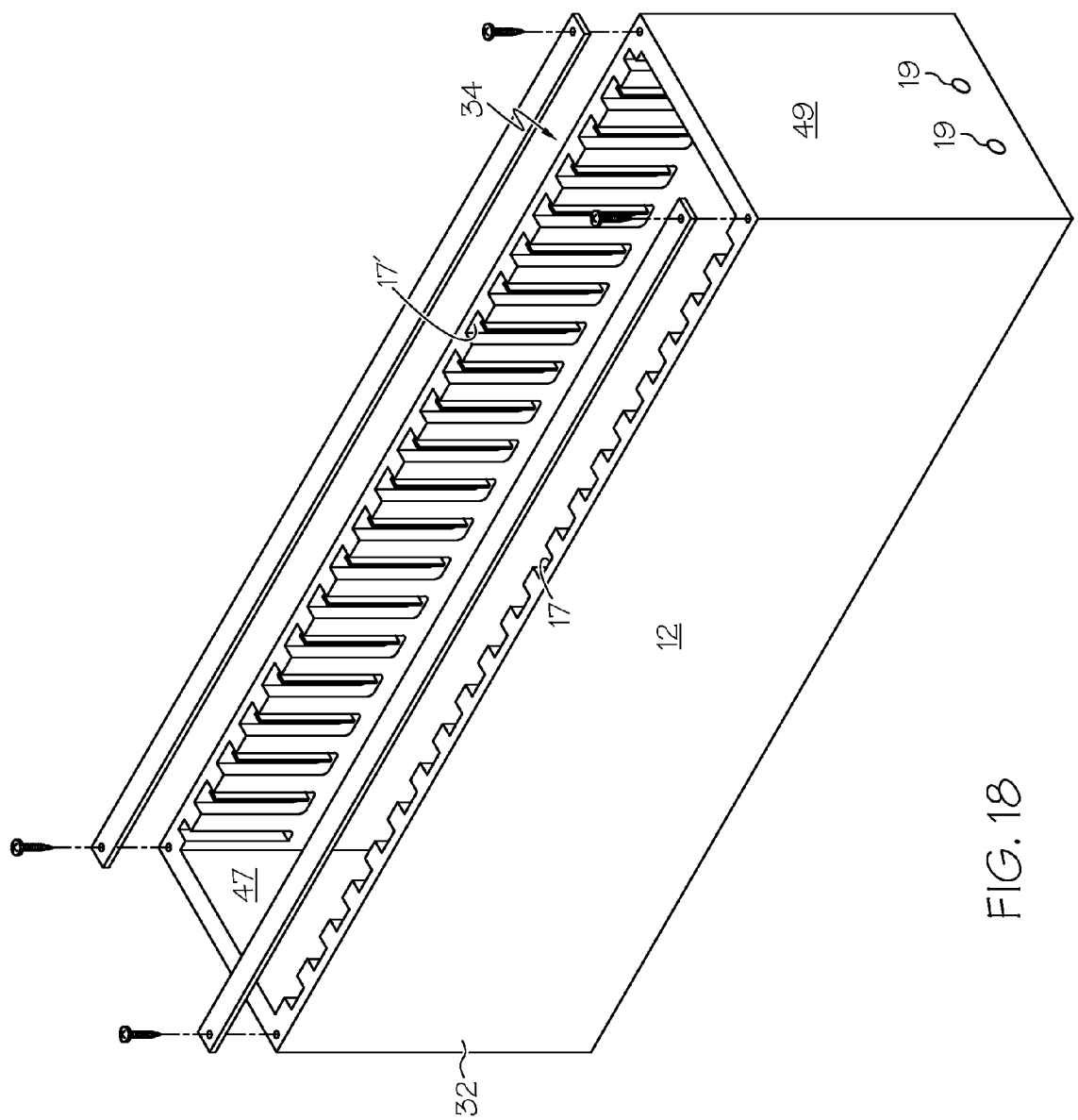
FIG. 18 is a perspective view of an aerator box showing the slotted walls and keeper strips.

Illustrated in FIG. 18 is a perspective view of the aerator box 12 of the module 10, showing the slots 17 and 17' extending down the sides of the box. The walls 32 and 34 are end-capped at both ends with left and right end-caps 47 and 49, the latter having through-apertures 19 for mounting the box. The keeper strips 71 and 71' are fastened to the upper surfaces of the longitudinal walls after the lower miniheaders are inserted in the slots 17 and 17'. As will be evident, it is not necessary that the slots be cut so that the included angle between successive pairs of miniskeins is the same, but equiangulated miniskeins are preferred. The aerator box 12 is preferably formed from a thermoformed synthetic resinous material such as a polyolefin, polyethylene. Illustrated in FIG. 19 is a perspective view of an open aerator box 12, having longitudinal walls front and rear longitudinal walls, 32 and 34 respectively, which have vertical angulated slots cut in the inside surfaces of the walls.

Figure 19:
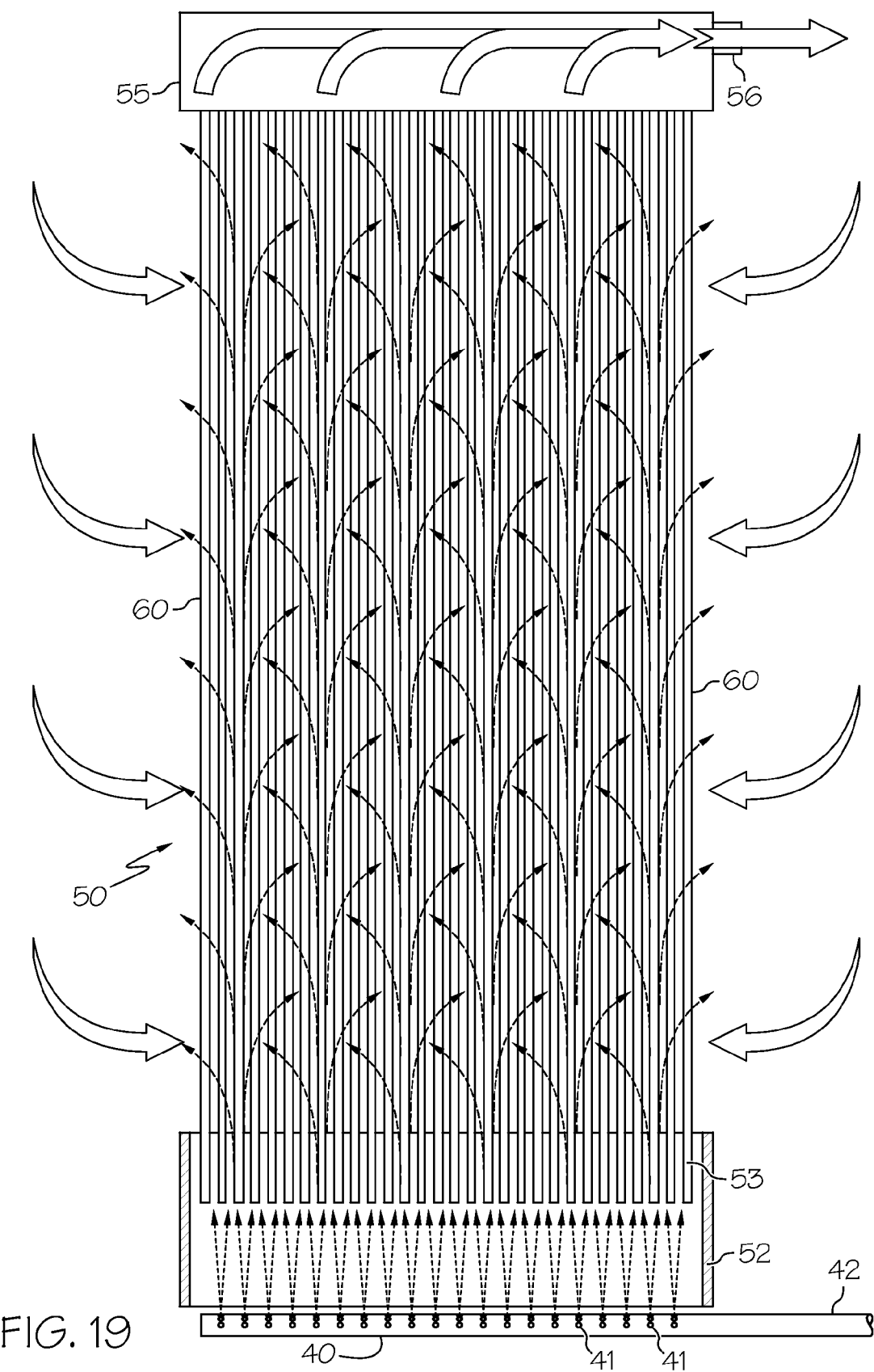
FIG. 19 is a schematic side view of an operating module illustrated in FIG. 2, with an air pipe beneath the aerator box.

Illustrated in FIG. 19 is a schematic illustration of an installed module 50 operating in a tank of wastewater, the module being scrubbed with air rising from holes in the air-diffuser 40. The amount and pressure of the air in air supply line 42 is adjusted so as to generate a flow pattern in which the rising air bubbles infiltrate the fibers of the miniskeins 60 and at the same time generating a circulation of wastewater which draws fresh wastewater to the surfaces of the fibers while exerting downward pressure on solids being deposited and scrubbed from the surfaces of the fibers. Suction on the permeate withdrawal line 56 results in withdrawal of permeate P.

Fibers having a nominal diameter in the range from about 0.2-3 mm, typically used for microfiltration and ultrafiltration of fluids, may be used, but preferred fibers are those having an outer diameter in the range from 0.5-2.5 mm. The wall thickness of a fiber is typically in the range from about 2% to about 60% of the outside diameter of the fiber, preferably from 0.1 mm to 0.5 mm. Such fibers operate with a transmembrane pressure differential in the range from 5 kPa (0.7 psi)-75 kPa (10.9 psi) and are used under ambient pressure with the permeate withdrawn under gravity. They are preferably flexible, if miniskeins with the planar ordered arrays described are to be made using a roller to position the fibers. The flexibility required is that sufficient to permit the fibers to be wrapped over the circumference of a roller corresponding to the chosen length of fibers in the miniskein.

Fibers are made of organic polymers and ceramics, whether isotropic, or anisotropic, with a thin layer or "skin" on the outside surface of the fibers. Some fibers may be made from braided cotton or polymeric fiber covered with a porous natural rubber latex or a water-insoluble cellulosic polymeric material. Preferred organic polymers for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly(ethylene terephthalate), poly vinylidene fluoride (PVDF) and the like. Ceramic fibers which do not lend themselves to roller-positioning in miniskeins are made from alumina, by E.I. duPont deNemours Co. and disclosed in U.S. Pat. No. 4,069,157, inter alia.

The method of securing the fibers in a header and the polymers used are well known in the art, the choice depending upon the compatibility with the fibers, the temperature at which the module is to operate, and the cost, the essential requirement being that each of the fibers be secured in fluid-tight relationship within each header to avoid contamination of permeate.

The performance of a skein is a function of the degree to which the surface of each of the fibers in a skein is available for filtration. Though the total area of fiber surface available depends upon the packing density of the fibers in the substrate, it also depends upon the degree to which the surfaces of the fibers in a miniheader are surrounded by other fibers.

Comparative Specifications for Comparison of Performance:

The performance of a '014 module (B1) having four (4) sub-bundled lower headers positioned, but not confined in a box, above an aeration pipe (AP1), is compared with that of a module of this invention (M1) comprised of miniskeins, in zig-zag configuration, mounted in an aerator box positioned over an identical aeration pipe (AP2). The upper header of the '014 module (B1) comprised sixteen (16) potted arrays, each with 135 fibers, at a spacing 's' of 0.8 mm; each sub-bundle comprised four (4) potted arrays, each with 135 fibers, at the same spacing of 0.8 mm. The upper header of the M1 module comprised thirty six (36) twin-array miniskeins mounted in an aerator box, upper portion of which were divided into seventy two (72) groups and potted with random spacing. Since only a single module B1 was being compared, and not multiple modules requiring a vertical gas conduit (116 in '014), an aeration pipe, the same as one used under the aerator box of M1, was used for B1. Side panels (118 in'014) were provided, one on either side of B1, to perform the same air-confining function performed by the aerator box of B1.

Each module B1 and M1 was constructed with:

| (a) the same fibers having the following specifications: | |
|---|---|
| Outside Diameter of fibers | 2.2 mm |
| Inside diameter of fibers | 0.9 mm |
| Pore size in membrane[§] | 0.03 μm |
| X-sectional area of a fiber | 3.80 mm$^2$ |
| Fiber length between headers | 1090 mm |
| (b) upper headers of each module having the same dimensions, namely | |
| length of each upper header | 402 mm |
| width of each upper header | 102 mm |
| footprint of each upper header | 0.041 m$^2$ |
| (c) dead-ended lower portions of fibers grouped as follows: | |
| potted sub-bundles of B1 as a group*: length of each | 402 mm |
| width of each sub-bundle | 15 mm |
| spacing between sub-bundles | 8 mm |
| [+]width of the group | 102 mm |
| aerator box of M1 - length | 402 mm |
| width | 102 mm |
| footprint of aerator box | 0.041 m$^2$ |
| width between side panels of (B1) | 110 mm |
| (d) other specifications of B1 and M1 | |
| overall height of B1 and M1 | 1300 mm |
| volume of B1 and M1 in water | 0.053 m$^3$ |
| number of fibers in skein of each module | 2160 |
| membrane surface area of each skein | 16.3 m$^2$ |
| cross-sectional area of fibers in each potted header | 0.0082 m$^2$ |
| packing density of fibers in upper header | 20% |
| membrane area/unit volume, (m$^2$/m$^3$) | 307 |

[§]Measured by polystyrene latex particles (ref: Separation and Purification technology 63(2008) 415-423)
*"group" refers to four spaced-apart sub-bundles, together
[+]4 sub-bundles are spaced 8 mm apart and have end-spaces of 9 mm at the outer end of the group The following are comparative specifications, in addition to those given above, for the four (4) "sub-bundled" fibers of the '014 skein, and the 36 miniskeins used in the M1 module.

| | Miniskein (M1) | Sub-bundle (B1) |
|---|---|---|
| Lower miniheaders/sub-bundles | 36 | 4 |
| Number of fibers in an array | 30 | 135 |
| Number of arrays in each | 2 | 4 |
| Width or thickness of mounting strip | 1.0 mm | — |
| Lateral spacing 's' between fibers (x-axis) | 0.8 mm | 0.8 mm |
| Transverse spacing between fibers (y-axis) | 1 mm | 0.4 mm |
| Number of fibers in module | 2160 | 2160 |
| Length (longitudinal, x-axis) | 102 mm | 402 mm |
| Width or thickness (y-axis) | 5.8 mm | 15 mm |
| Footprint | 5.916 cm$^2$ | 60.30 cm$^2$ |
| Packing density $\delta_h$ | 38.5% | 34.0% |
| $\delta_{he}$ in aerator box/group | 20% | 20% |
| vol of fibers in rect prllped 20 cm high | 45.6 cm$^3$ | 410.4 cm$^3$ |
| $\delta_v$ in each lower miniheader/sub-bundle | 0.372 | 0.340 |

The foregoing comparison of specifications for the two modules does not provide a reasonable basis for determining whether M1 or B1 will provide better performance. However, it will be evident that, if a minimal two-array miniskein with only 60 closely spaced-apart fibers, each 2.2 mm in diameter, provides a packing density $\delta_h$ on the miniheader of 38.5%, then $\delta_h$ for a comparable six-array miniskein, 102 mm in length, a mounting strip 1 mm thick, and with 0.4 mm thickness of adhesive between successive arrays, the packing density $\delta_h$ on the miniheader 15.8 mm in width (thick) will be 42.5%. At spacing >0.8 mm the $\delta_h$ may be as low as 30%.

The effective packing density will change as a function of the $\delta_h$, if the area of the aerator box remains the same. Preferably the effective packing density in the aerator box is in the range from 15-30%, depending upon the number of miniskeins in an aerator box, and their configuration therein.

It is also evident that volumetric packing density $\delta_v$, whether in the lower miniheader of a miniskein or in a sub-bundle, will also affect performance; but the degree to which $\delta_v$ will do so, is not predictable. What may be concluded that, depending upon the physical specifications of the fibers used, the fiber-spacing at which they are deployed, the number of arrays in a miniskein, and the manner of the arrangement of arrays in a miniskein, a desirable range of volumetric packing density $\delta_v$ for a lower miniheader, in a rectangular parallelpiped column of substrate 20 cm in height, measured from the upper surface of a lower miniheader, is in the range from 0.32-0.4, more preferably greater than 0.34.

Making the Comparison:

The two modules ultrafiltration modules B1 and M1 having the specifications listed above, are mounted side-by-side in a 1.0 m$^3$ pilot plant tank containing 0.8 m$^3$ of activated sludge ("dirty water" substrate) at 21° C. A vertical steel plate separates the two modules which are submerged in, and share the same activated sludge having a concentration of 10,000 mg/L total solids, the high concentration of solids being used to provide an accelerated test. The fibers in each module are continuously "air scrubbed" during an 8 hr operating day, at a flow rate of 4.0 m$^3$/hr/module, using a coarse bubble diffuser to generate bubbles. The air bubbles are discharged from an aeration pipe positioned about 15 cm beneath (i) the sub-bundled headers in B1, and (ii) the aerator box of M1. To ensure homogeneity of the activated sludge, a slip-stream is withdrawn from the tank, and continuously recycled during the 8 hr operating day.

The upper portions of the fibers of each skein are potted in potting resin 5.0 cm thick to provide headers from which permeate is withdrawn. The potting resin used is polyurethane having a hardness of about 60 Shore D. The lower ends of the membranes are dead-ended before they are sub-divided into four bundles and potted in individual lower headers each potted in potting resin 5 cm thick, in 4 pans, each 40 cm long and 1.5 cm wide, and spaced apart from each other by 13.3 mm, so that the width of the group of 4 sub-bundles in a composite lower header has a width of 102 mm.

The comparison of performance is based on measuring trans-membrane pressure adjusted to 20° C. (TMP 20) at an instantaneous permeating flux of 50 LMH (liters/meter$^2$/hr) because this measurement provides a sensitive quantification of fouling.

Permeate from each module is withdrawn through permeate withdrawal lines from the upper headers by generating about 30 kPa suction with a vacuum pump. Permeate withdrawn has an average reading of about 0.8 NTU (nephelometric turbidity units), which is substantially clear to the naked eye and is evidence of the capability of the membranes. The comparison test is run on consecutive days, 8 hr/day.

Figure 20:
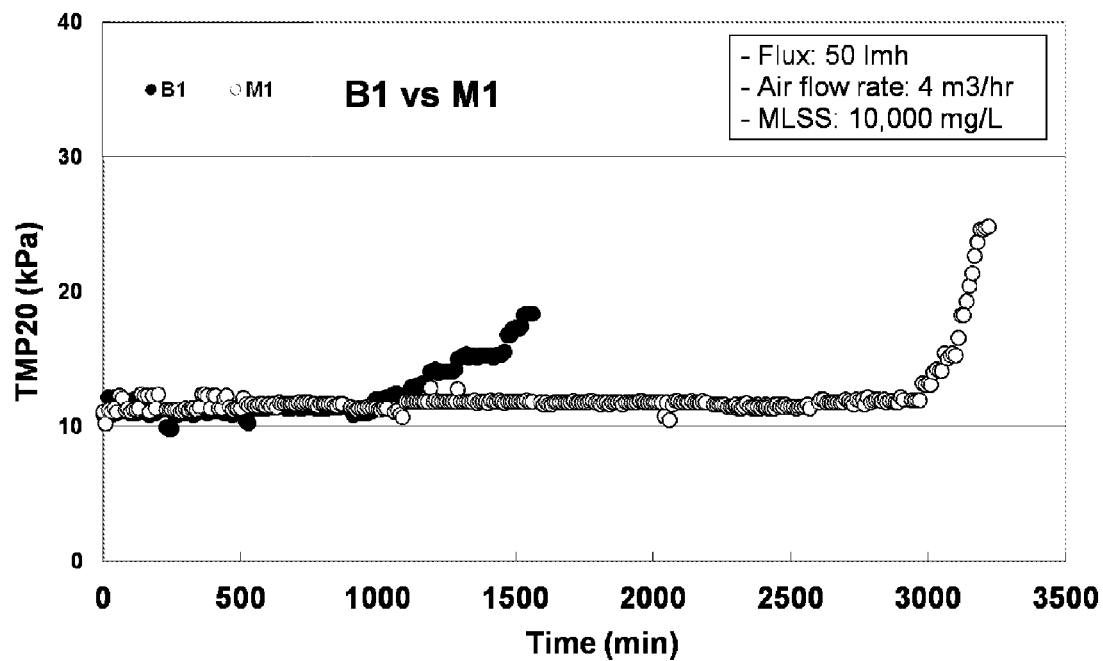
FIG. 20 is a graph plotting transmembrane pressure (TMP) against time of operation for each of two modules operated side by side in the same "dirty" water having 10 mg/L of solids, with an instantaneous flux of 50 Lmh, and an air flow rate (under the sub-bundles or miniskeins) of 4 $m^3$/hr. The open circles record the TMP v. time for operation of the invented module; the solid circles record the TMP v. time for operation of the '014 module.
Figure 21:
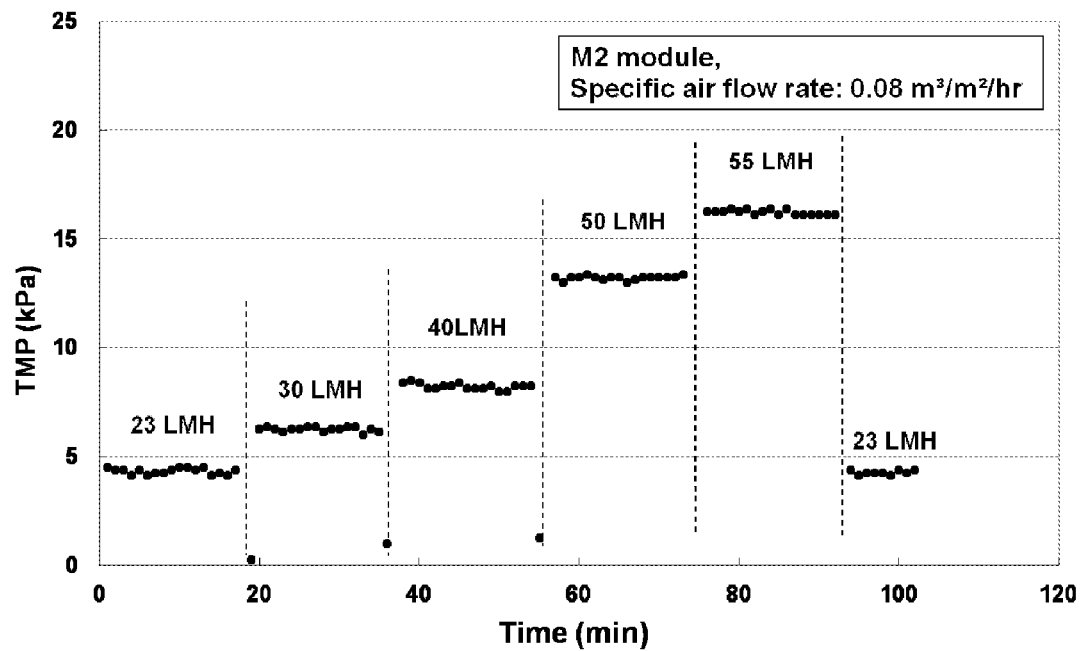
FIG. 21 is a graph plotting variation in TMP during each of successive time periods during which a M2 module with miniskeins was operated in wastewater with a specific air flow rate of 0.08 $m^3/m^2$/hr, at various incrementally increasing flux, to determine critical flux.
Figure 22:
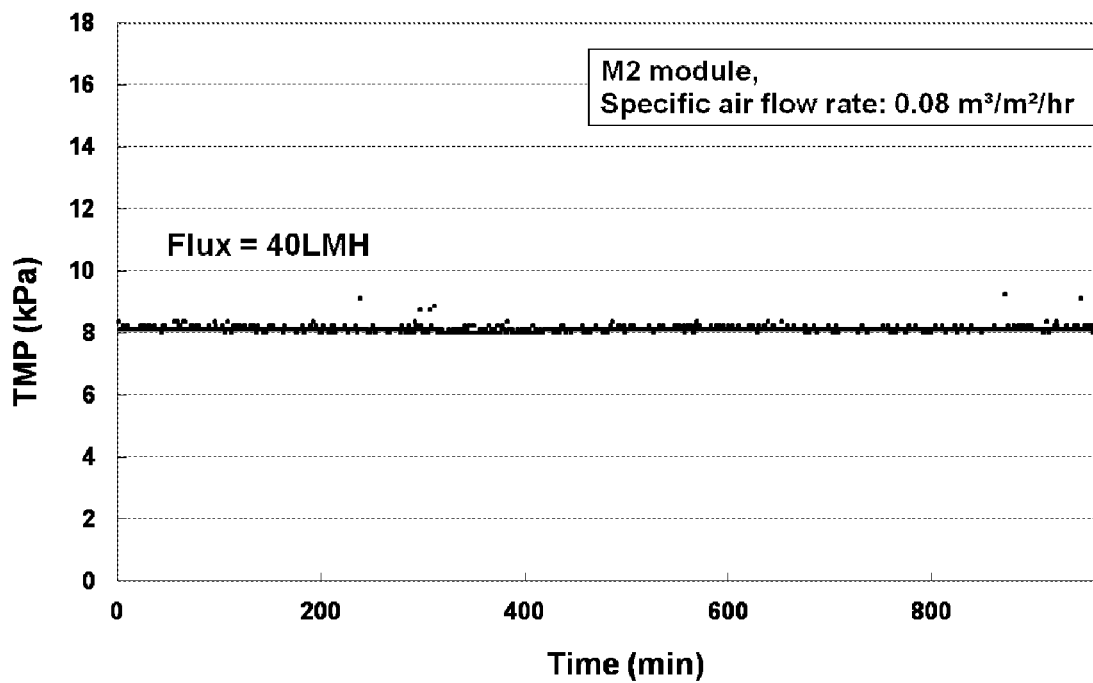
FIG. 22 is a graph plotting variation in TMP during a 16 hr period while each of successive time periods during which a M2 module with miniskeins was operated in wastewater at a chosen flux of 40 lmh, with a specific air flow rate of 0.08 $m^3/m^2$/hr.
Figure 23:
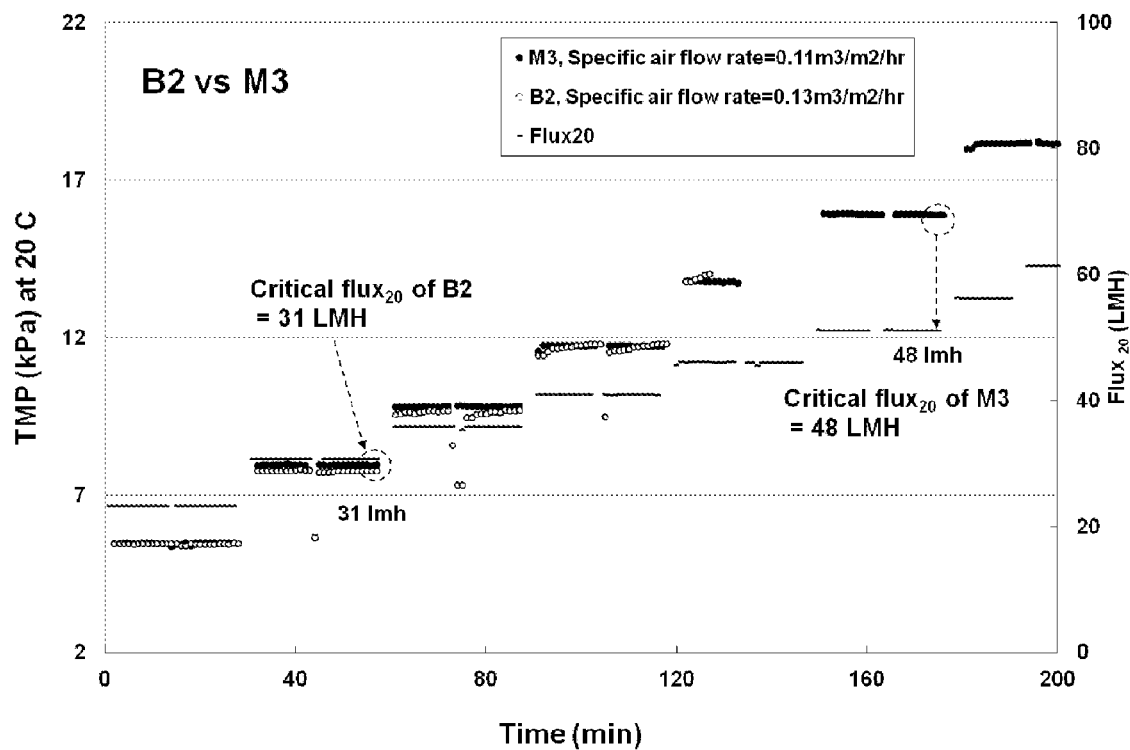
FIG. 23 is a graph plotting variation in TMP during a 200 min period on the left ordinate and flux on the right ordinate to compare the critical flux obtained with multiple prior art '014 modules (B2) and multiple modules with miiskeins (M3), both in cassettes.

Both modules are manually back-washed by pulsing 25 LMH of permeate through the fibers for 1 min each day. The graph in FIG. 20 presents TMP20 data points as a function of time during which the modules were operated. Measurements were made on samples drawn every 10 minutes, using an automatic data logger.

It is evident from a comparison of the two graphs, that the performance of each module is comparable (about 12 kPa) over the first sixteen hours, but after that time, the TMP 20 for B1 ('014) begins to rise and approaches 19 kPa after 25 hrs of operation. In contrast, M1 continues to operate at about 12 kPa level for 50 hr of continuous operation over each 8 hr day, before the TMP 20 begins to rise above 12 kPa.

The foregoing comparison provides evidence that, given the membrane surface area of a module, the performance is greatly enhanced if the fibers are divided into miniskeins with the aforementioned limitations, and operated in a module with an aerator box in which the miniskeins are mounted in a zig-zag configuration, the miniskeins lying in transverse relationship to the longitudinal axis of the upper header, rather than in conventionally potted lower headers in sub-bundles lying in a parallel relationship with the longitudinal axis of the upper header.

Having thus provided a general discussion of the novel module, described and illustrated it with specific examples of the best mode of making and using it, it will be evident that the novel module has provided a more effective and economic module for a difficult and demanding water-purification need. It is therefore to be understood that no undue restrictions are to be imposed by reason of the specific embodiments illustrated and discussed, and particularly that the novel module is not restricted to a slavish adherence to the details set forth herein.

| REFERENCE NUMERALS for CHE-002 | | | |
|---|---|---|---|
| 10 | module, generally | 11 | fibers of skein |
| 12 | aerator box, composite lower header | 13 | lower portions of fibers |
| 14 | upper header | 15 | upper portions of fibers |
| 16 | permeate withdrawal line | 17 & 17' | vertical slots in opposed long'l sides of 12 |
| 18 | | 19 | through-apertures for mounting box |
| 20 | miniskein | 21 | mounting strip |
| | | 21' & 21" | opposed end of mounting strip 21 |
| 22 | adhesive | 23 | miniheader |
| 24 | miniheader with 6 arrays | 25 | first array |
| 26 | second array | 27 & 27' | first arrays on each side of 31 in 28 |
| 28 | 4-array miniheader | 29 & 29' | second arrays on each side of 31 in 28 |
| 30 | upper header w/potted miniheaders | 31 | same area box with non-potted miniheaders |
| 32 | front longitudinal wall of 58 | 33 | longer box of module |
| 34 | rear longitudinal wall of 58 | 35 | |
| 36 | planar arrays of '014 | 37 | upper header of arrays in '014 appln |
| 38 | | 39 | sub-bundles of arrays in upper header |
| | | 39a-39d | sub-bundles of 39 |
| 40 | air diffuser | 41 | through-apertures for air supply |
| 42 | air supply line | 43 | |
| 44 | front wall of 46 | 45 | rear wall of 46 |
| 46 | upper header for 24 | 47 | left end wall of 12 |
| 48 | aerator box dor 24 | 49 | right end wall of 12 |
| 50 | second module | 51 | |
| 58 | aerator box | 53 | lower non-potted miniheader |
| 54 | upper potted miniheader | 55 | upper header |
| 56 | permeate with'l line | 57 & 57' | slots in opp'sd long'nal walls of 58 |
| 58 | aerator box (FIG. 2) | 59 | |
| 60 | miniskein | 61 | fibers of second skein |
| 62 | | 63 | lower portions of fibers |
| 64 | | 65 | upper portions of fibers |
| 66 | | 67 & 67' | slots in opp'sd long'nal walls of 55 |
| 68 | | 69 | |
| 70 | | 71 | |
| 72 | | 73 | |
| 74 | | 75 | |
| 76 | | 77 | |
| 78 | | 79 | |
| 80 | | 81 | |
| 82 | | 83 | |
| 84 | | 85 | |
| 86 | | 87 | |
| 88 | | 89 | |
| 90 | | 99 | |
| 91 | | 92 | |
| 93 | | 94 | |
| 95 | | 96 | |
| 97 | | 98 | |
| 99 | | 100 | |
| 111 | | 111 | |
| 112 | | 113 | |
| 114 | | 115 | |

We claim:

1. In a module for withdrawing permeate from a multicomponent liquid substrate while increasing the concentration of particulate material therein, the module including: a multiplicity of polymeric hollow fiber membranes ("fibers") for outside-in filtration, unconfined in a shell, the fibers being subject to a transmembrane pressure differential from 5 kPa (0.7 psi) to 75 kPa (10.9 psi); the improvement comprising, the module comprising an elongated upper header vertically (z-axis) spaced apart from an aerator box having a footprint no greater than 35% greater than that of the elongated upper header, the elongated upper header and aerator box each extending longitudinally (x-axis) in the same direction, and at least 4 miniskeins, each having a lower miniheader mounted in the aerator box;

each miniskein comprising, from two to twelve (2-12) planar ordered arrays of the fibers, each array having from 10-250 fibers secured in laterally spaced apart relationship relative to each other in each lower miniheader, upper portions of the fibers are assembled in an upper miniheader and potted in the elongated upper header, and lower portions of the fibers are adhesively secured in the lower miniheader, the upper miniheader and lower miniheader being disposed in vertically (along the z-axis) spaced-apart relationship with each other at a first distance;

the upper portions of the fibers of each upper miniheader are potted in the elongated upper header so as to be integral therewith, and have lumens of upper ends of the fibers in open fluid communication with a permeate collection means;

the lower portions of the fibers have ends plugged and adhesively secured in laterally spaced-apart relation to each other in each planar ordered array, at least two planar ordered arrays being secured, back-to-hack, in the lower miniheader;

mounting means, disposed at opposed ends of each lower miniheader, for slidably mounting each lower miniheader in slots in opposed walls of the aerator box; and, each mounted lower miniheader is transversely (y-axis) disposed relative to the aerator box's longitudinal x-axis, in a zigzag configuration, so that successive lower miniheaders in the configuration have an included angle between the successive lower miniheaders from 1-20 degrees.

2. The module of claim 1 wherein,
the elongated upper header and aerator box are each at least twice as long as each is wide;
the lower miniheader with mounting means has an effective width greater than a with of the aerator box;
each lower miniheader is mounted in the slots for up and down movement of the lower miniheader in the slots; and
each of the fibers is substantially the same length as others in the miniskein, the length being from 0% to 5% longer than said first distance, so as to permit restricted displacement of an intermediate portion of each fiber, independently of the movement of another fiber in the miniskein.

3. The module of claim 2 wherein,
the fibers have a nominal diameter 'd' from 1 mm-3 mm, secured in spaced-apart relationship from 0.1 d to less than 3 d apart,
each lower miniheader comprises from 2-6 planar ordered arrays of the fibers, so that less than about 65% of the fibers are surrounded by adjacent fibers of arrays, and
the opposed walls of the aerator box have angulated vertical slots so as to hold each mounting means of each lower miniheader angulated relative to both the x-z and the y-z planes.

4. The module of claim 3 wherein each lower miniheader is assembled without being potted.

5. The module of claim 4 wherein the mounting means are provided by opposed ends of a mourning strip.

6. The module of claim 4 wherein the mounting means are provided by a pair of T-shaped mounting pins.

7. The module of claim 4 wherein the mounting means are provided by a pair of stub-strips.

8. The module of claim 4 wherein each lower miniheader is slidably confined by a weight of the fibers and friction between the mounting means and surfaces Of the slots, so as to present substantially linear fibers swayable in the substrate during operation of the module for displacement no more than 15% on either side of the vertical.

9. The module of claim 4 wherein the upper portions of fibers of each miniskein are potted in the elongated upper header in a configuration selected from
   (i) randomly positioned relative to each other in an upper miniheader, vertically above the corresponding lower ends of arrays of fibers in the lower miniheader of the same miniskein, with upper portions of fibers of a first miniskein naturally separated from upper portions of an adjacent second miniskein by virtue of all fibers being substantially straight due to their own weight under gravity, when the miniskeins are held with lower miniheaders above a potting pan in which the upper portions are to be potted;
   (ii) confined between tines of a separation means, the upper portions of fibers of adjacent miniskeins being separated, one miniskein from another adjacent miniskein, so that upper miniheaders are potted in parallel relationship, each at right angle to the x-axis;
   (iii) upper portions of fibers of each miniskein secured in arrays in an upper miniheader equipped with mounting means, the upper miniheaders are held in parallel, spaced-apart, vertical slots in opposed walls of a potting pan; and,
   (iv) upper portions of fibers of each miniskein secured in arrays in upper miniheaders equipped with mounting means, analogously with the secured arrays in the lower miniheader, and, each upper miniheader is potted so that it is positioned vertically directly above, and in approximate mirror-image relationship with the corresponding lower miniheader in which the lower ends of fibers are secured, when the areas of the elongated upper header and the box are essentially equal.

10. The module of claim 4 wherein a packing density "$\delta_h$" of fibers in a lower miniheader is greater than 0.35, and an effective packing density of fibers in the aerator box is less than 0.38.

11. The module of claim 4 wherein packing, density "$\delta_h$" of fibers in a lower miniheader is from 0.35-075, and a volumetric packing density "$\delta_y$" of fibers in the substrate is greater than 0.12 and less than 0.4.

12. The module of claim 4 wherein the mounting strip has a thickness from 0.1-2 mm.

13. A method for making a module for withdrawing permeate from a multicomponent liquid substrate while increasing the concentration of particulate material therein, the method comprising,
   (i) assembling at least four miniskeins each comprising at least two, and up to twelve, planar ordered arrays of fibers, each array having from 10-250 fibers, lower portions of which are adhesively secured in as lower miniheader, upper portions of the fibers to be potted in an elongated upper header to be integral therewith, the lower portions of the fibers having ends plugged, at least two planar ordered arrays being secured, back-to-back, in the lower miniheader with mounting means at opposed ends of the lower miniheader, each array having the fibers adhesively secured in laterally spaced-apart relationship with each other in each lower miniheader;

(ii) potting the upper portions of the fibers in the elongated upper header so as to have lumens of the fibers in open fluid communication with a permeate collection means, the elongated upper header being spaced apart vertically above an aerator box having a footprint no greater than 35% greater than that of the elongated upper header, the elongated upper header and aerator box each extending longitudinally (along the x-axis) in the same direction; and, (iii) slidably mounting each lower miniheader of each miniskein in slots in opposed walls of the aerator box, successive lower miniheaders being in transversely, angularly spaced-apart (along the x-axis) relationship with each other in a zigzag configuration relative to the longitudinal axes (x-axis) of the elongated upper header and aerator box, so that the successive lower miniheaders in the configuration have an included angle between the successive lower miniheaders from 1-20 degrees in the aerator box.

14. The method of claim 13 including securing each lower miniheader of each miniskein for up-and-down movement in the opposed walls of the aerator box.

* * * * *